United States Patent [19]

Yoshinobu

[11] Patent Number: 5,684,526
[45] Date of Patent: Nov. 4, 1997

[54] SYSTEM AND METHOD FOR RESPONDING TO TWO-WAY BROADCAST PROGRAMS

[75] Inventor: Hitoshi Yoshinobu, Kanagawa, Japan

[73] Assignee: Sony Corporation, Tokyo, Japan

[21] Appl. No.: 395,253

[22] Filed: Feb. 28, 1995

[30] Foreign Application Priority Data

Mar. 4, 1994 [JP] Japan .................. 6-060215

[51] Int. Cl.$^6$ .................. H04N 7/10; H04N 7/14
[52] U.S. Cl. .................. 348/13; 348/12; 348/10; 348/7; 348/11
[58] Field of Search .................. 348/12, 11, 7, 348/13, 2; 434/351, 350; H04N 7/10, 7/14

[56] References Cited

U.S. PATENT DOCUMENTS

| | | | |
|---|---|---|---|
| 4,926,255 | 5/1990 | Von Kohorn | 348/13 |
| 5,193,058 | 3/1993 | Bassili | 364/419 |
| 5,343,239 | 8/1994 | Lappington | 348/13 |
| 5,497,185 | 3/1996 | Dufresne | 348/2 |
| 5,537,143 | 7/1996 | Steingold | 348/13 |

*Primary Examiner*—John K. Peng
*Assistant Examiner*—Vivek Srivastava
*Attorney, Agent, or Firm*—Lise A. Rode, Esq.; Jerry A. Miller

[57] ABSTRACT

A system and method for two-way broadcast programs includes a response information transmitting apparatus, two-way broadcast receiving apparatus, and a response information receiving apparatus. The system also preferably includes a remote control transmitter for responding to requests made during the two-way broadcast programs. The difference between the time at which the response is made to a two-way broadcast program and the time at which information about the response is transmitted is added to the response information, thereby allowing the receiving side of the response information to correctly recognize the response time based on the time difference. Since the information associated with the responding operation includes the above-mentioned time difference, the responding side need not have precise time information, unlike the case in which information about the absolute response time is added. Therefore, the responding side need not manage time constantly. Furthermore, because determination is made from a time difference as opposed to an absolute time, the response destination can determine the order in which the responses have been made, while performing transmission processing in a manner so that the concentration of access attempts and thus line congestion on a particular telephone line is reduced. Such a system and method allows for the offering of such two-way broadcast programs as first-come, first-serve quiz shows which have been difficult to practice with conventional systems which use telephone lines for transmitting responses.

34 Claims, 18 Drawing Sheets

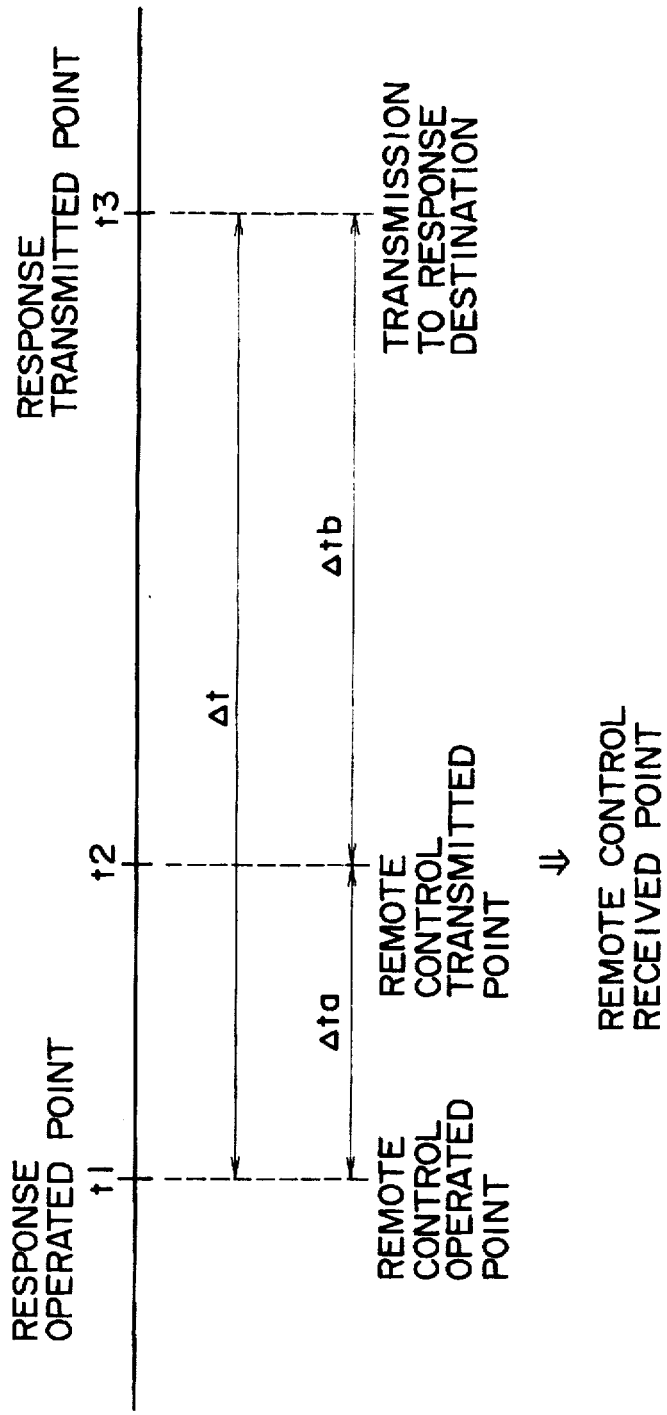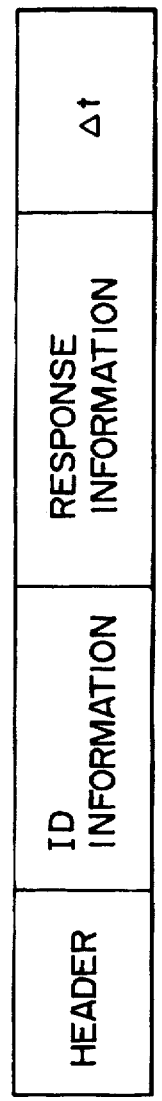

DTMF SIGNAL PROTOCOL IN TELEPHONE LINE

| ITEM | ALLOWANCE |
|---|---|
| SIGNAL SEND TIME | 50 ms OR MORE |
| MINIMUM PAUSE (MINIMUM VALUE OF PAUSE BETWEEN ADJACENT SIGNALS) | 30 ms OR MORE |
| FREQUENCY (SIGNAL SEND TIME + MINIMUM PAUSE) | 120 ms OR MORE |

SYSTEM AND METHOD FOR RESPONDING TO TWO-WAY BROADCAST PROGRAMS

BACKGROUND OF THE INVENTION

The present invention relates to a system and method for responding to a two-way broadcast program sent by broadcasting for example, television broadcasting. More specifically, the present invention relates to a remote control transmitter for transmitting an operation for making a response to a two-way broadcast program, an apparatus for transmitting information about the response, an apparatus for receiving the two-way broadcasting, and an apparatus for receiving the response information.

Two-way broadcasting in which viewers can participate in a particular program through access over a telephone line exists in the fields of television and radio broadcasting. Such a system is shown in U.S. patent application Ser. No. 08/355,132 filed on Dec. 13, 1994, entitled "Multiplex Broadcasting System", which is assigned to the assignee of this application and which is incorporated by reference herein. In television and radio broadcasting, two-way broadcasting is used in programs such as TV shopping, polling surveys, and audience-participating quiz game shows. In these types of programs, a telephone number or address for receiving the response from viewer is either announced or displayed by superimposition on a television screen, wherein the audience makes the response by telephone or facsimile.

Conventionally, the order in which the participating viewer makes responses in TV shopping or quiz programs is determined by the order in which the response telephone calls terminate; in other words, on a first come, first served basis. In a quiz program in which participants press respective answer buttons as quickly as possible, a winner may be determined in less than one second, for example. If such a program is performed via telephone lines, the number of calls and call requests by the participating viewers concentrate on a specific line. This, in turn, causes congestion on the line, thereby making it possible that a participant calling later is actually answered before a participant who called earlier.

Furthermore, it is known that in view of the various ages of telephone central office equipment, telephone connection conditions are locally different. For example, some areas have a relatively large number of circuit links between telephone exchanges which delay connection. Additionally, some areas require the dialing of a toll number while others do not. It is also possible that a participant may receive a call just before he or she wishes to respond to a quiz. Thus, the conventional method of determining which participating viewer has given an answer first, on the basis of call terminating sequence, may not always provide a fair criteria for deciding whether a viewer is actually the first to answer. Therefore, the conventional two-way broadcasting cannot offer such audience participating programs as the above-mentioned quiz program in which an exact sequence of answering determines a winner.

To solve the above-mentioned problems, a method may be conceived in which a clock circuit is built into a device found in the viewer's home, such as a television receiver. The clock circuit measures the time it takes the viewer to respond to a quiz (for example) and then transmits this measured time along with the answer to the broadcasting side. According to this method, the broadcasting side can with certainty get the time at which each answering operation has been made, thereby making it possible to fairly handle the sequence in which answers have been given.

It will be appreciated, however, that the above-mentioned method requires that the built-in clock be set to a correct time. Of course, it is difficult to assure that each participating viewer has the exact time and therefore there is no assurance that the correct time is set. Again, as a result, a second caller who actually responded after a first caller may show an earlier time of response, if, for example, the time on his clock is set slower than that of the first caller.

In order to solve the above-mentioned problems, one method has been proposed in which correct time information is set from the broadcasting side. In another method, the time information itself is multiplexed with a main broadcast signal. According to the former method, the broadcasting side multiplexes a signal for controlling the setting of the clock circuit of the viewer side, with the main broadcast signal, the participants' receivers receive the clock setting control signal to set a common time on their clocks. According to the latter method, data indicating a current time is multiplexed with the main broadcast signal and the viewer side demultiplexes the time data as the response time. The viewer side then adds the demultiplexed time data to the response information to be sent back to the broadcasting side.

However, the above-mentioned methods both require some means for extracting the time information from the multiplexed signal and decoding the extracted time information on the viewer side, thereby increasing the cost of the receiving device, e.g. the television receiver. Furthermore, if processing on the viewer side is to be implemented by employing an external adapter (instead of inside the audience's receiver such as a television receiver), the receiver, and the adapter must be connected with each other by a cable to transmit the above-mentioned time setting control signal and time information from the receiver to the adapter. It will be understood that this also increases the cost.

If, on the other hand, a tuner for receiving the broadcast signal and the above-mentioned means for decoding the control signal and time information are incorporated in the adapter itself and, in the two-way broadcasting, and the tuner in the adapter is used to view programs, there is no need for connection between the receiver and the adapter. However, such an adapter becomes very costly.

All of the above-mentioned problems would occur also in the cable television (CATV) broadcasting when there is a congestion in the response access by audience.

OBJECTS AND SUMMARY OF THE INVENTION

It is therefore an object of the present invention to provide a method and apparatus for allowing the broadcasting side to detect an actual time at which each participating viewer has responded, without involving the problems and costs associated with a response terminal apparatus and regardless of congestion in the transmission path through which the participating viewers make the response.

In carrying out the invention and according to one aspect thereof, there is provided a method of transmitting a response by a two-way broadcast program viewer to a predetermined response destination, wherein response information generated by a viewer's response is transmitted to the predetermined response destination at a time later than the viewer's responding time, and time information containing the difference between the viewer's responding time and the later transmission time is added to the response information before the transmission back to the broadcast side.

In carrying out the invention and according to another aspect thereof, there is provided a remote control transmitter, comprising a clock circuit, an operator section for use in making a response, a transmitter for transmitting a remote control signal, a transmission information generator for generating information corresponding to the response, and a controller for calculating, from information coming from the clock circuit, the time difference between the time at which the response has been made on the operator section and the time at which the information corresponding to the response is transmitted from the remote control signal transmitter to a remote control signal receiving apparatus, wherein said time difference is added to the information corresponding to the response, and the resultant information is transmitted from the transmitter.

In carrying out the invention and according to still another aspect thereof, there is provided a transmitting apparatus for transmitting response information by receiving a remote control signal from the above-mentioned remote control transmitter to transmit the response information to a predetermined response destination, said apparatus comprising a receiver for receiving the remote control signal, a response information generator for generating response information to be transmitted to the predetermined response destination, a transmitter for transmitting the response information to the predetermined response destination, a clock circuit, and a controller for calculating the time difference between the time at which the information corresponding to the response has been received by the receiver, and a time at which the response information is transmitted from the transmitter, wherein said time difference is added to the response information and the resultant information is transmitted from the transmitter.

In carrying out the invention and according to yet another aspect thereof, there is provided a transmitting apparatus for transmitting response information without remote control, comprising a receiver for receiving a remote control signal, a clock circuit, an operator section for use in selecting a response, a response information generator for generating response information corresponding to the selected response made on the operator section, a transmitter for transmitting the response data received by the above-mentioned receiver to the predetermined response destination, and a controller for calculating the time difference between the time at which the response has been made on the operator section and the time at which the response information is transmitted from the transmitter, wherein said time difference is added to the response information and the resultant information is transmitted from the transmitter.

In carrying out the invention and according to a further object thereof, there is provided a receiving apparatus for two-way broadcasting systems, incorporating one of the above-mentioned transmitting apparatus (including the transmitting apparatus without remote control).

In carrying out the invention and according to still another aspect thereof, there is provided a receiving apparatus (on the response destination side) for receiving the response information, said apparatus comprising a clock circuit, an extracting unit for extracting from the response information, the information about the time difference between the time at which the responding operation has been made by an audience and the time at which the response information has been transmitted, a detector for detecting reception of the response information based on time information coming from the clock circuit, and a calculating unit for calculating the time at which the response has been made from the time at which the response information has been received and the extracted time difference information.

According to the above-mentioned method of transmitting a response by a viewer of a two-way broadcast program, the response information about the responding operation is not transmitted to the response destination upon the responding operation by the audience; instead, the response information is transmitted at a later time. A time difference between the time at which the response has been made and a time at which the response information is transmitted is added to the response information to be transmitted.

If the responding operation is performed through a remote control transmitter, the time difference between the time at which a response has been made and the time at which a remote control signal is transmitted to a remote control receiver is added to the information corresponding to the response coming from the remote control transmitter. After receiving the remote control signal from the remote control transmitter, the transmitting apparatus for transmitting the response information to the response destination adds a time difference between the time at which the information has been received from the remote control transmitter and the time at which the response information is actually transmitted to the response destination to the response information. Namely, the difference time information to be added to the response information to be transmitted to the response destination indicates the time between the time when the response has been made by the viewer through the remote control transmitter and the time when the response information is actually transmitted to the response destination.

The receiving apparatus for receiving the response information on the destination side detects the time at which the response information has been received based on time information coming from the incorporated clock circuit. Then, the receiving apparatus subtracts from the time at which the response information has been received the time difference added to the response information. This difference provides the time at which the audience actually has made the response. Thus, the response destination recognizes the absolute time at which the viewer has made the response.

The above and other objects, features and advantages of the present invention will become more apparent from the accompanying drawings, in which like reference numerals are used to identify the same or similar parts in several views.

BRIEF DESCRIPTION OF THE DRAWINGS

FIG. 1A and 1B are diagrams describing a response method for a two-way broadcast program, the method being practiced as one preferred embodiment of the invention;

DESCRIPTION OF THE PREFERRED EMBODIMENTS

This invention will be described in further detail by way of example with reference to the accompanying drawings.

The present invention is applicable to broadcasting modes including television broadcasting and FM and AM broadcasting by ground wave, satellite broadcasting, and cable television (CATV). For simplification, the following preferred embodiments are examples of television applications. However, it will be appreciated that the invention can be practiced in the other aforesaid broadcasting areas, and that the invention herein is not limited to the field of television broadcasting. Furthermore, in these embodiments, responses made by participating audiences are transmitted over standard telephone lines; however, the invention is not limited as such, and responses may be transmitted over comparable modes of transmission as known in the art.

I Preferred Embodiment

Figure 2:
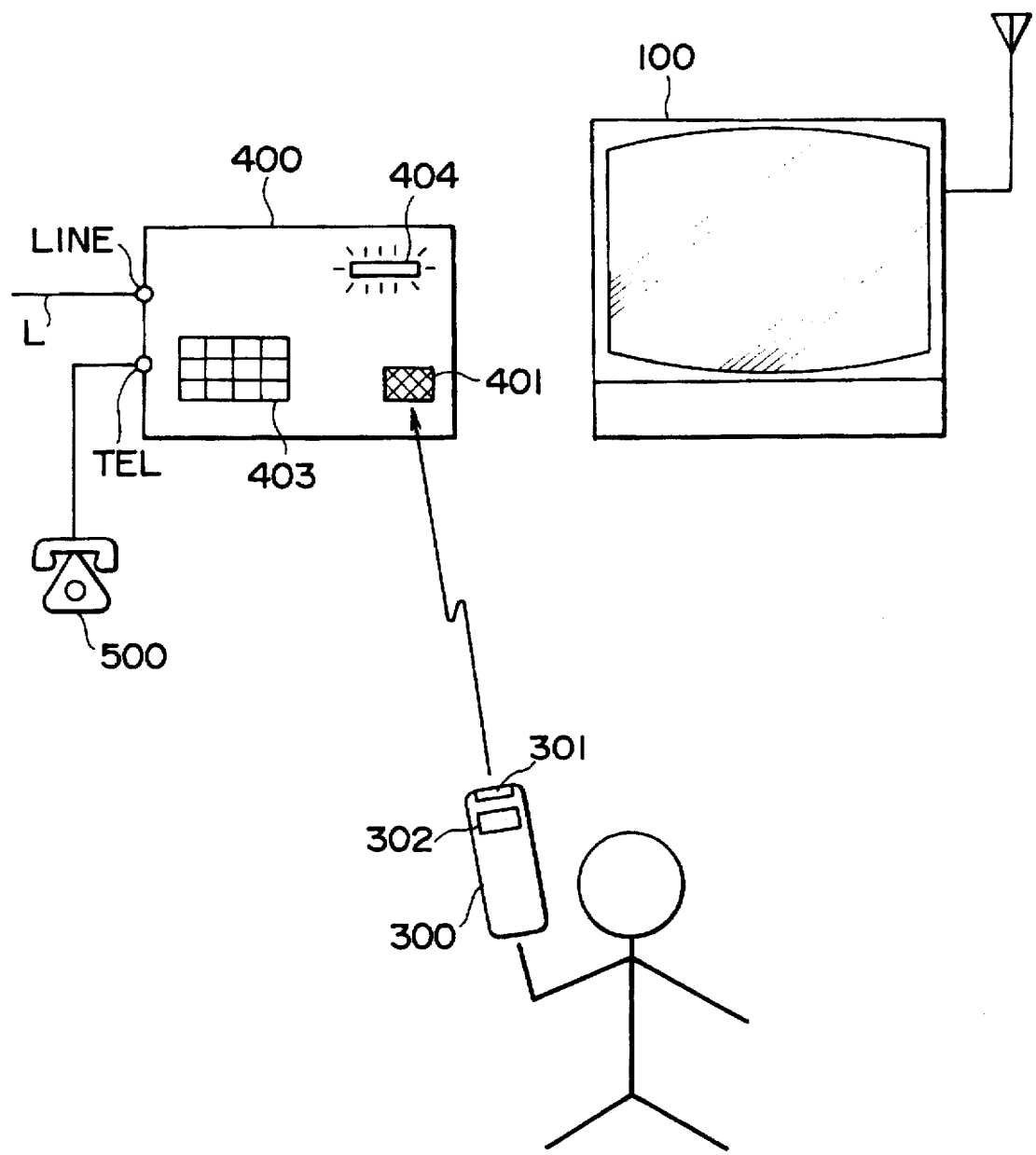
FIG. 2 is a schematic diagram illustrating a preferred embodiment of a receiving system including a remote control transmitter for selecting a response and a preferred embodiment of a response information transmitting apparatus.

Referring to FIG. 2, there is shown a preferred embodiment of the receiving side of a two-way broadcasting system.

In FIG. 2, reference numeral 100 indicates a television receiver of which screen and speaker provide interface between a two-way broadcast program and a user or participating viewer(s). Reference numeral 300 indicates a remote control transmitter for selecting a response. (As described in detail later, the remote controller is not a necessity in the present invention, and may in fact be eliminated. However, in the preferred embodiment, a remote control transmitter is used for allowing viewers to select responses). The user viewing the two-way broadcast program provided via the television 100 preferably operates the remote control transmitter 300 to enter identification information associated with the program and to respond upon request by the program. A remote control signal is then generated by the remote control transmitter 300 and sent to a transmitting apparatus 400 for transmitting the viewer's response ultimately to a predetermined destination.

The response information transmitting apparatus 400 receives the information from the remote control transmitter 300, the information again, reflecting the operation performed by the viewer. In this case, the remote control signal is implemented by infrared radiation, so that the remote control transmitter 300 is provided with an infrared transmitter 301 and the response information transmitting apparatus 400 is provided with a remote control light receiver 401 for receiving the infrared radiation. It will be understood that other methods of transmitting signals by remote control may be used instead.

The response information transmitting apparatus 400 is preferably an adapter provided completely separate from the television receiver 100 and that same are not connected even with a cable. The response information transmitting apparatus 400 receives, from the remote control transmitter 300, the identification information associated with a broadcast program and stores the received information in a buffer memory for use in transmitting the response information to the response destination. At the same time, when the response information transmitting apparatus 400 receives a signal indicating transmission of the response information, the transmitting apparatus 400 sends the response information to the predetermined destination over a telephone line.

For this purpose, the response information transmitting apparatus 400 has a terminal LINE for connecting to a telephone line L to be described later and preferably incorporates a data communication modem. The transmitting apparatus also has a terminal TEL for connecting a telephone terminal thereto. A telephone set 500 is connected to the terminal TEL so that the single telephone line L can be shared between data communication and voice communication from the telephone set 500. The transmitting apparatus 400 thus has an NCU (Network Control Unit) for switching between the data and voice communications.

In the preferred embodiment, when transmitting the response information from the transmitting apparatus 400, a time difference between the time at which the user has operated the remote control transmitter 300 to make a response to a particular quiz or questionnaire and the time at which the response information is actually transmitted is added to the response information. The time difference is added as information associated with the time at which the user has actually performed the responding operation.

To be more specific, referring to FIG. 1A, it is supposed, for example, that the user operates the remote control transmitter 300 for responding at time t1 and presses a remote control transmit button at time t2 to send the response information to the transmitting apparatus 400. Then, as will be described, an elapsed time Δta from t1 to t2 is added to the information to be sent from the remote control transmitter 300 to the transmitting apparatus 400.

At t2, the response information transmitting apparatus 400 receives a remote control signal coming from the remote control transmitter 300. Then, at t3 set in a manner to be described, the transmitting apparatus 400 sends the response information to the predetermined response destination over the telephone line L. At this moment, an elapsed time Δtb between t2 and t3 is Calculated in the transmitting apparatus 400. The obtained elapsed time Δtb is added to the elapsed time Δta to provide a total elapsed time Δt, which is added to the response information to be sent over the telephone line L. As seen in FIG. 1A, the elapsed time Δt is a time between t1 and t3. Consequently, if the response destination receives response information at t3, the response destination can recognize the responding operation time as t1 which is earlier than t3 by Δt.

In the present embodiment, as shown in FIG. 1B, the response information includes a header for indicating a response command; identification (ID) information such as program ID information and an apparatus ID (an ID number of the response information transmitting apparatus 400, which may be a serial number given at the manufacture of the apparatus) for viewer identification to be described later; response information such as a selected response number, and the elapsed time Δt.

In what follows, the preferred embodiments of the remote control transmitter 300 and the response information transmitting apparatus 400 will be described in further detail.

A. Remote control transmitter

Figure 3:
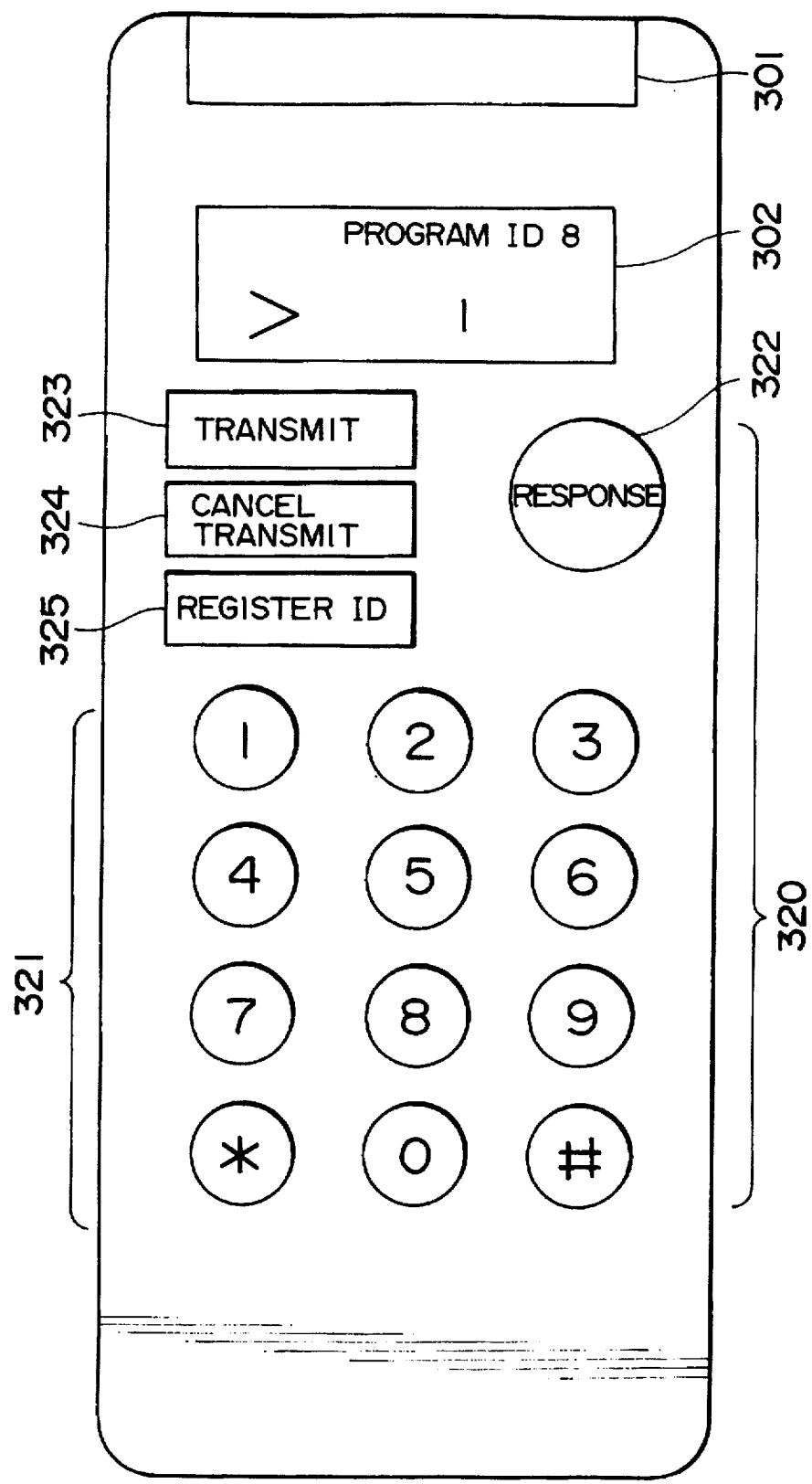
FIG. 3 is a plan view of the remote control transmitter of a preferred embodiment of the invention.
Figure 4:
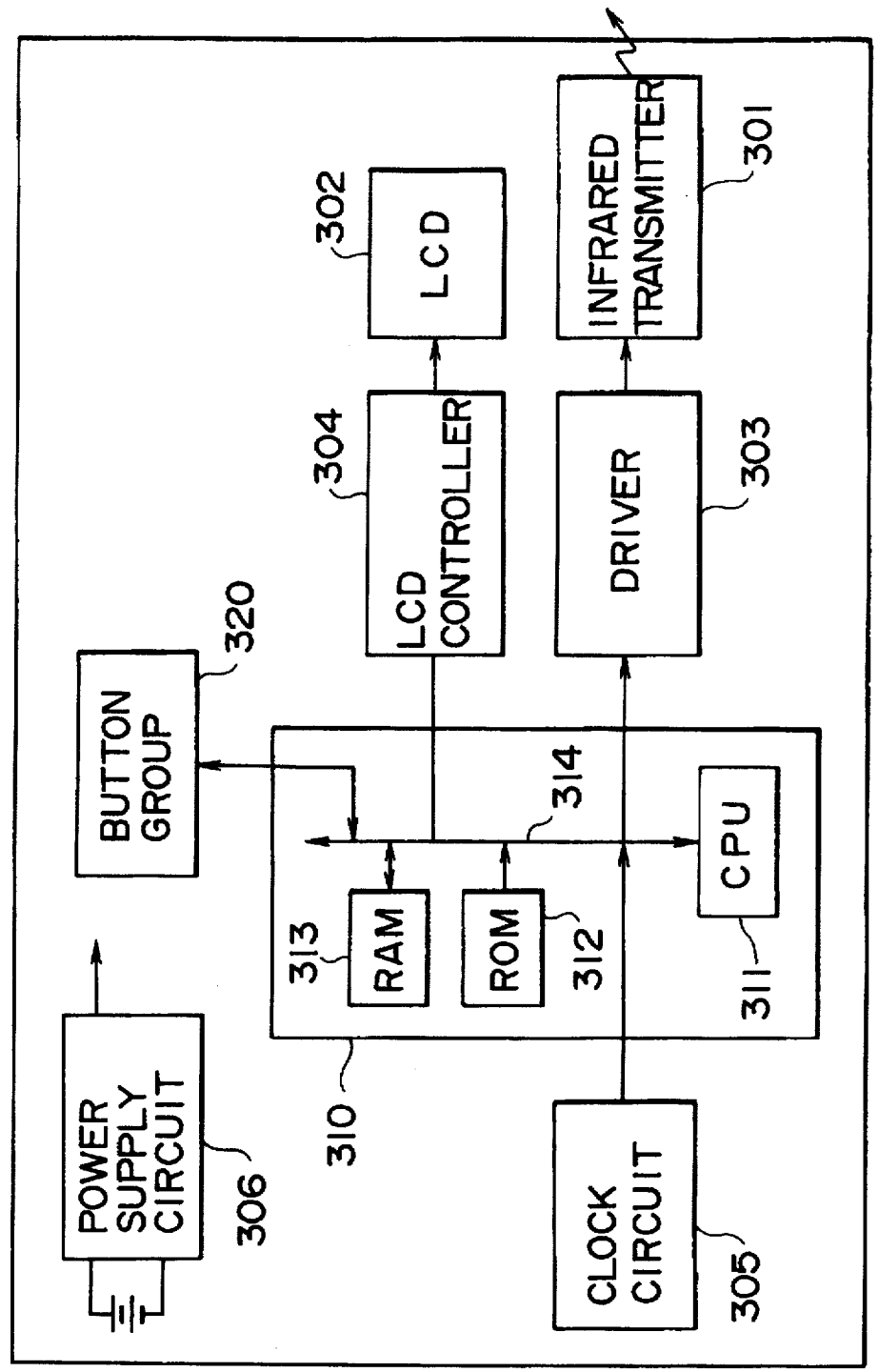
FIG. 4 is a block diagram illustrating the circuitry of a preferred embodiment of a remote control transmitter of the present invention.

Referring to FIGS. 3 and 4, there are respectively shown a front plan view of the remote control transmitter of the present embodiment and a general block diagram of the internal electrical circuitry of the remote control transmitter.

As shown in FIG. 3, the remote control transmitter 300 is preferably adapted so that all of its operations are controlled by a one-chip microcomputer 310 (FIG. 4). As is known, the one-chip microcomputer 310 includes a central processing unit (CPU) 311, a read-only memory (ROM) 312 for storing a program and fixed data such as data to be displayed on a liquid crystal display (LCD), and a random access memory (RAM) 313 providing a work memory. Data is exchanged over system bus 314. It should be noted that the one-chip microcomputer 310 preferably has a nonvolatile memory (not shown). Further, as shown in FIGS. 3 and 4, the remote control transmitter 300 of the present embodiment preferably has an infrared transmitter 301 and an LCD 302 as well as an operator button group 320.

The operator button group 320 of the remote control transmitter 300 includes numeric buttons "0" through "9", said operator button group 320 preferably comprising a response select button group 321, including a button "#" and a button "*", and four functional buttons, including a response button 322, a transmit button 323, a transmission cancel button 324, and ID register button 325. The one-chip microcomputer 310 periodically scans the operator button group 320 to detect which button is pressed.

As seen in FIG. 4, the infrared transmitter 301 is connected to the one-chip microcomputer 310 via a driver 303. When any of buttons of the operator button group 320 is pressed, a corresponding remote control signal is supplied from the one-chip microcomputer 310 to the infrared transmitter 301 via the driver 303.

In a preferred embodiment, an LCD 302 is connected to the one-chip microcomputer 310 via an LCD controller 304. The LCD controller 304, under control of the one-chip microcomputer 310, displays a specified image (including characters, numbers, and/or icons) on the LCD 302.

The remote control transmitter 300 also has a clock circuit 305 in the preferred embodiment. The clock circuit 305 provides a current time to the one-chip microcomputer 310. It should be noted that this remote control transmitter 300 is preferably driven by a battery-based power supply circuit 306. The power supply circuit 306 is designed so that it is placed in a sleep mode if no button has been pressed within a certain period of time, thereby supplying power only to the LCD and other essential portions for the purpose of power saving.

Figure 5:
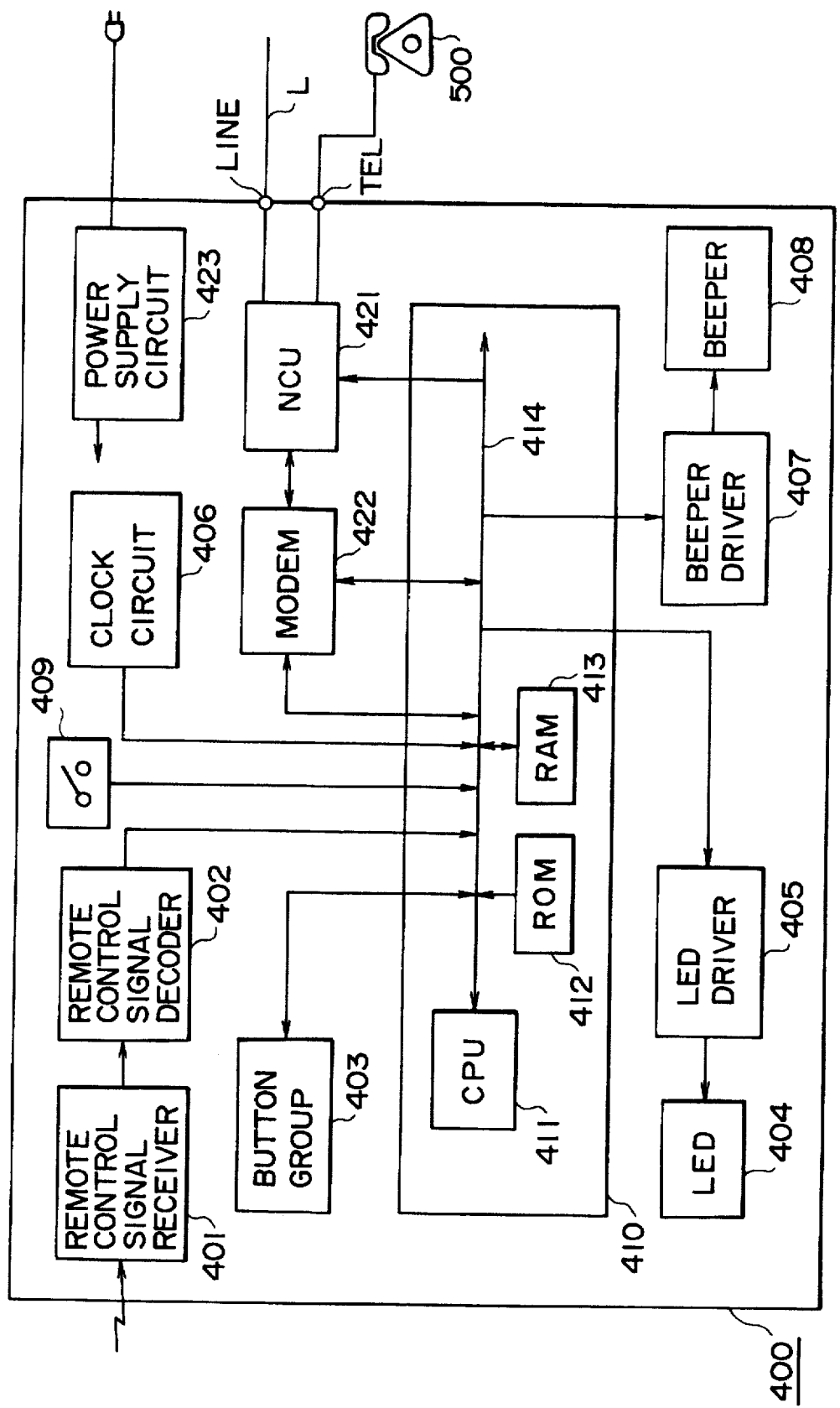
FIG. 5 is a block diagram illustrating a preferred embodiment of the response information transmitting apparatus.

B. Response Information Transmitting Apparatus Referring now to FIG. 5, there is shown a general block diagram of the response information transmitting apparatus 400 of the present embodiment. Like the above-mentioned remote control transmitter, this transmitting apparatus 400 is also preferably designed so that its operations are all controlled by a one-chip microcomputer 410 similar to the one-chip microcomputer 310. The one-chip microcomputer 410 includes a CPU 111, a ROM 412 for storing a program and fixed data, and a RAM 413 as a work memory. Data is exchanged over a system bus 414. As with the case of one-chip microcomputer in the remote control transmitter, the one-chip microcomputer 410 preferably has a nonvolatile memory (not shown).

The fixed data to be stored in the ROM 412 preferably includes an identification (ID) number (a manufacture serial number for example) of the transmitting apparatus and a telephone number of a predetermined destination for each two-way broadcast program. The destination telephone number is stored in look-up table in the ROM and corresponds to a particular two-way broadcast program. A program identification number (ID) is set to each program. This program ID may be superimposed on a TV screen or provided as an audio signal from the broadcasting side to the user such as by an announcement by a master of ceremonies of the program.

Then, when the user sends the program ID from the remote control transmitter 300, the response information transmitting apparatus 400 locates in the ROM, the telephone number of a two-way broadcast program corresponding to the program ID and uses the telephone number as automatic dialing information when sending response information.

The transmitting apparatus 400 in the present embodiment also has operator buttons 403. The one-chip microcomputer 410 periodically scans the operator buttons 403 to detect which button is pressed. In those embodiments having a remote control transmitter, an infrared command signal is sent from the remote control transmitter 300 is received by an infrared remote control signal receiver 401, decoded by a remote control signal decoder 402, and sent to the one-chip microcomputer 410. In those embodiments where the viewer has no remote control transmitter, the viewer may instead use the buttons 403 to respond.

Reference numeral 404 indicates a light emitting diode (LED) which also may be provided on the transmitting apparatus 400. The LED 404 is controlled by the one-chip microcomputer 410 via a LED driver 405 to be turned on, off, or blinking, thereby indicating the operating states of the transmitting apparatus 400 including power on/off state, whether there is information to be transmitted, and whether there is a communication error and the like.

A beeper 408 may also be provided on the transmitting apparatus 400. The beeper 408, which is controlled by the one-chip microcomputer 410 via a beeper driver 407, generates a sound having a pitch and/or rhythm corresponding to the particular control. For example, when a transmission has ended successfully, the beeper sounds once or, if an abnormal operation has been made, the beeper sounds multiple times. Alternatively, the beeper may identify these operating states by different melodies.

Similar to the remote control transmitter 300, the response information transmitting apparatus 400 has a clock circuit 406. The clock circuit 406 calculates time information and sends the resultant time information to the one-chip microcomputer 410. The clock circuit 406 also serves as a trigger for sending an interrupt signal to the CPU 411 after a certain period of time.

In order to send response information over a telephone line L, the transmitting apparatus 400 has an NCU (Network Control Unit) 421 and a modem 422. The modem 422 controls the NCU 421, modulates data to be transmitted, and demodulates the received data.

The NCU 421 has telephone capabilities and therefore can perform such functions as on-hook capabilities for transmission of information, dialing functions (generating tones by DTMF (Dual Tone Multi-Frequency) or dial pulses), off-hook operation, and maintenance of a loop with a telephone set 500 connected to the NCU 421 via a terminal TEL (a modular jack).

A switch 409 is installed for the user in order to allow the response information transmitting apparatus 400 to operate as an adapter according to a type of the telephone line (e.g., a tone line, dial line (10 pps) or (20 pps), or an exchange office line/analog extension). The setting of this switch is recognized by the one-chip microcomputer 410.

The response information transmitting apparatus 400 is preferably driven by a commercial AC power with a power supply circuit 423 connected to an AC wall receptacle.

C. Transmitting and Receiving Response Information

The following describes the response information transmitting and receiving operations in the present embodiment by using, as an example, a case in which a viewer (a user) provides a first-come, first-served response to a two-way broadcast quiz program. The description will be divided into the following six topics:

(1) Operation of the remote control transmitter 300;

(2) Processing occurring in the remote control transmitter 300;

(3) Remote control signal receive processing of the response information transmitting apparatus 400;

(4) Transmission time calculation processing of the response information transmitting apparatus 400;

(5) Response information transmission processing of the response information transmitting apparatus 400; and (6) Response information receiving processing at the response destination.

(1) Operation of the remote control transmitter 300:

In two-way broadcasting, a program ID, a quiz number ID or a channel ID is first given to an audience by announcement of the master of ceremonies of the program or by superimposition of the ID on the television screen. These IDs are hereinafter generically referred to as the "program ID" for the convenience of description.

If a viewer wants to participate in, or make a response to, the program, and has a remote control transmitter 300, he enters the announced or superimposed program ID (an ID number) by operating corresponding response select buttons 311 on the remote control transmitter 300. The entered program ID is preferably displayed on an LCD 302 of the remote control transmitter 300.

Then, the viewer presses an ID registration button 325, after which the display on the LCD 302 preferably goes off once, upon which the program ID displayed in a status display section (an upper or lower portion of the display screen of the LCD 302) is preferably replaced with the entered number. At the same time, the entered number is also stored in the RAM 313. Thus, preparation for participation in the program has been completed.

When a first-come, first-served quiz is set, the viewer enters a number corresponding to an answer of the quiz question, by pressing corresponding buttons of the response select button group 321 as soon as he gets the answer. The time at which the viewer enters his response is the response operated time. The number entered from the response select button group 321 is preferably displayed on the LCD 302.

Confirming the entered number on the LCD 302, the audience directs the remote control transmitter 300 toward the response information transmitting apparatus 400 and presses the transmit button 323 for remote control transmission.

Upon reception of a remote control signal from the remote control transmitter 300, the response information transmitting apparatus 400 preferably generates a beep and lights the LED 404 to confirm receipt of the response information. If for some reason, the remote control signal is not received correctly, the transmitting apparatus 400, the transmitting apparatus 400 does not generate the beep at all or generates an alarm beep (e.g., four beeps). If this happens, the audience must press the transmit button 323 on the remote control transmitter 300 once again.

During the time that the response information to be sent to the response destination of the broadcasting side is held in the transmitting apparatus 400, the transmitting apparatus 400 keeps the LED 404 lighted to indicate that there is the response information has yet to be transmitted. When the response information has been transmitted to the destination, the LED 404 blinks for example and then goes off.

During the time that the LED 404 is steadily on, the viewer can cancel the transmission of the response information. If, after pressing the transmit button 323 on the remote control transmitter 300, the viewer wants to cancel the response information transmission, the audience directs the remote control transmitter 300 toward the response information transmitting apparatus 400 and presses the transmission cancel button 324. The transmitting apparatus 400 then beeps to inform the viewer whether the transmission cancel operation has been successful or not. When sending of the response information has been canceled, the LED 404 blinks for example and then goes off.

To respond to a next quiz question, the viewer presses the response button 22. The number entered last and displayed on the LCD 302 is then cleared for a next entry. That is, the response button also works as a clear button in this instance.

It should be noted however, that in the present embodiment, the program ID cannot be cleared, and may only be rewritten by a new registration. Therefore, if the ID is an ID that indicates a quiz number, the ID is announced by the broadcasting side for each quiz, thereby requiring the audience to register the ID for each quiz.

Figure 6:
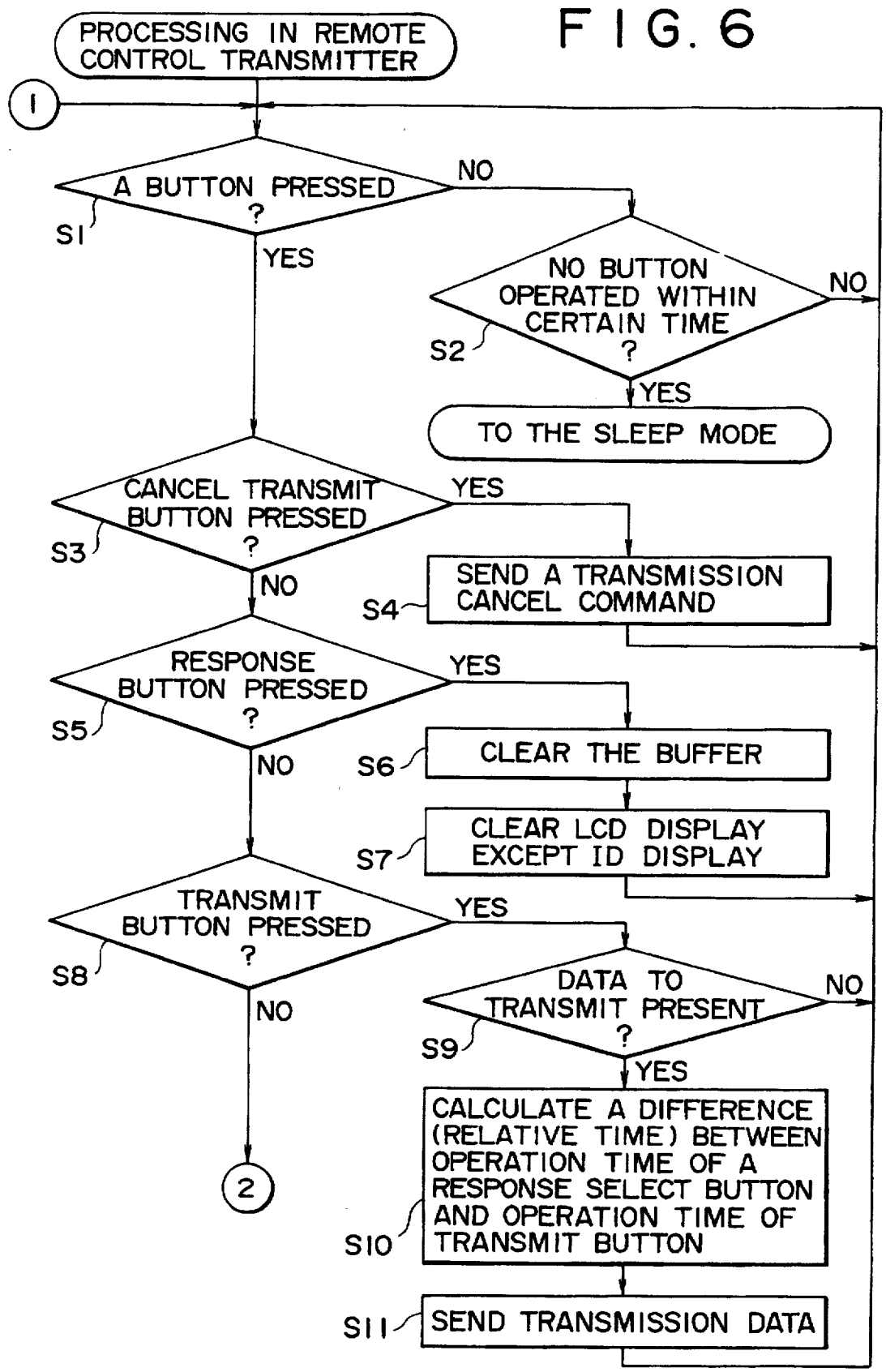
FIG. 6 is a part of a flowchart describing the internal processing operations of the remote control transmitter of FIG. 4.

(2) Processing that takes place in the remote control transmitter 300:

Processing from the re-activation of the remote control transmitter 300 to the sleep mode and beyond will be described with reference to FIG. 6. As mentioned before, for purposes of conserving power, the remote control transmitter 300 in the present embodiment is placed in the sleep mode if no button has been selected after a certain period of time has elapsed (steps S1 and S2). During the sleep mode, the LCD display is preferably kept on. When a button is operated, the remote control transmitter 300 is re-activated to perform processing specified by the selected button.

If the cancel transmit button 324 has been pressed (FIG. 3), the remote control transmitter sends a transmission cancel command from the infrared transmitter 301 (steps S3 and S4). If the response button 322 has been pressed, however, the number information selected last by the response select button group 321 and stored in a buffer (a buffer area in the RAM 313 for example) is cleared (steps S5 and S6) and the display on the LCD 302 (except for the program ID) is cleared (step S7).

If the transmit button has been previously pressed and there is data to be transmitted (steps S8 and S9), the time indicated by the clock circuit 305 at that moment is checked.

An elapsed time (a relative time) between the last pressing of the response select button group 321 and the pressing of the transmit button of this time is calculated (step S10) as the time difference Δta (FIG. 1A). As shown in FIG. 1B, the header information indicating a transmission command, the ID information stored in the RAM 312 by the above-mentioned ID registration, and the elapsed time information obtained in step S10 are transmitted from the infrared transmitter 301 (step S11).

Figure 7:
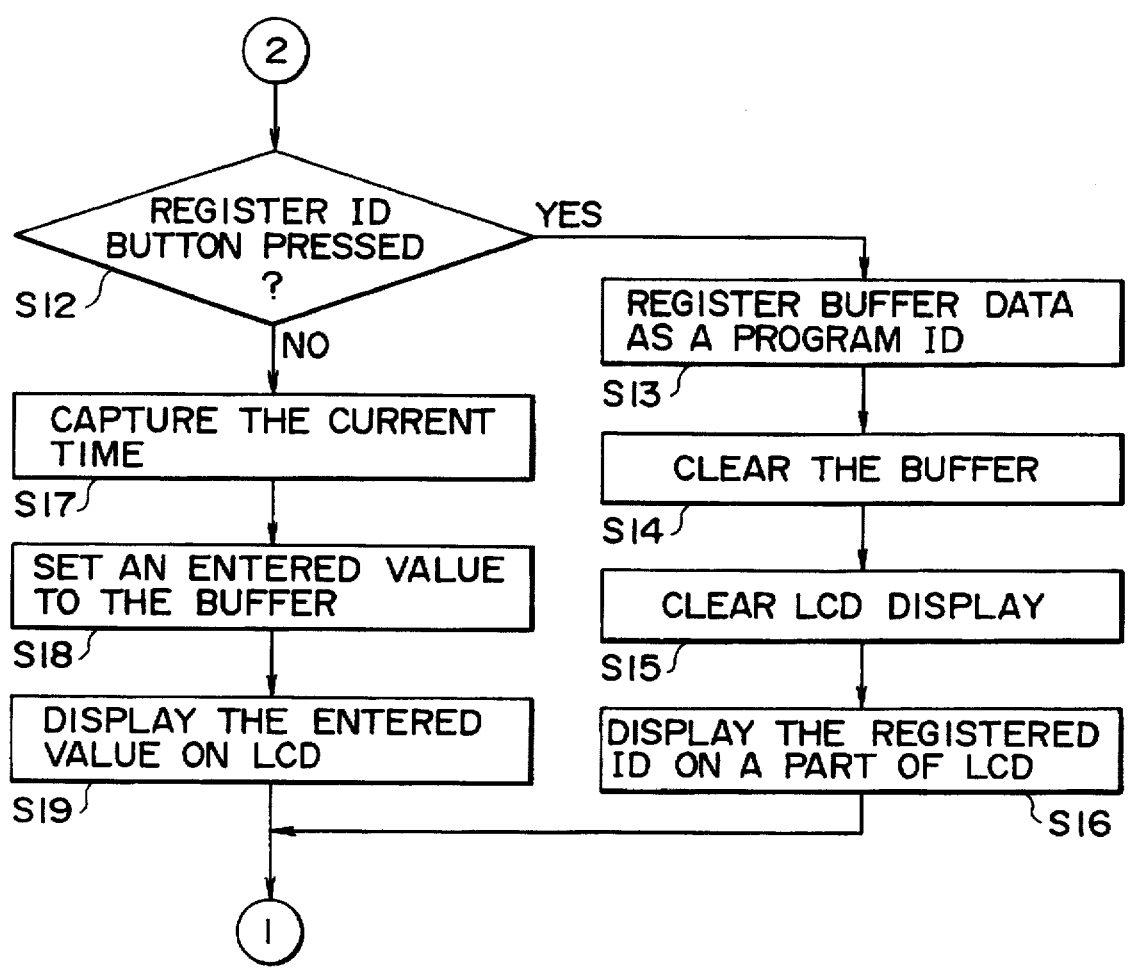
FIG. 7 is a continuation of the flowchart of FIG. 6.

Then, when the ID registration button 325 is pressed, an entered number or numeric string stored in the buffer is registered in the RAM 313 as a program ID (steps S12 and S13—FIG. 7).

After clearing the buffer (step S14) and the display on the LCD 302 (step S15), the registered program ID is displayed in the status display section of the LCD 302 (step S16).

If a button other than the above-mentioned buttons has been pressed, the pressed button must thus be one of the response select button group 321. In this case, a current time (time t1 of FIG. 1A, for example) indicated by the clock circuit 305 is stored in the RAM 313. The stored current time is written to the buffer along with a number for the pressed button, the number being also displayed on the LCD 302 (steps S17 and S18).

The internal processing of the remote control transmitter has thus been outlined. In this embodiment, specifications of the remote control transmitter 300 are such that if a button in the response select button group 321 is pressed later it is always valid, the time at which the later pressing having been made providing a "pressed (responded) time". If the transmit button 323 is pressed multiple times, an elapsed time starting from the pressing of the response select button group 321 is calculated each time. Therefore, the pressed time can always be identified without error.

It should be noted that the correct current time need not be set on the clock circuit 305, because the clock circuit 305 is used only to calculate the relative time, or the time elapsed from the responding operation to the transmitting operation. This is preferable since it allows for the probability of different clock settings for different viewer receivers. Furthermore, it is not required for the clock circuit 305 to calculate the elapsed time in units of year, month, day, and date, and the clock circuit 305 may be one that only has a time telling capability in units of time to which the clock is reset at battery replacement.

(3) Remote control signal receiving processing of the response information transmitting apparatus 400:

The response information transmitting apparatus 400 receives, at the remote control signal receiver 401, an infrared signal command coming from the remote control transmitter 300. The one-chip microcomputer 410 of the transmitting apparatus 400 monitors the received infrared signal command and performs processing accordingly.

The processing in the transmitting apparatus 400 is divided into one that is performed upon reception of the infrared signal command and another that is performed with a delay. For example, processing for telephone line accessing, such as the transmission of response information, is controlled so that the accessing is made with a random delay for each transmitting apparatus 400 thereby preventing access operations from concentrating in a short time and overloading a telephone line (or exchange). To do so, in the present embodiment, upon reception of a transmission command from the remote control transmitter 300, the transmitting apparatus 400 lights the LED 404 to indicate that there is response information, thus enabling the viewer to cancel the transmission until the response information is actually transmitted.

In the above-mentioned method in which the transmission time at making response is randomly delayed for each transmitting apparatus 400, the transmitting apparatus 400 sets the actual transmission time based on 1) a unique apparatus ID (an ID number assigned at manufacture) that the transmitting apparatus 400 has as fixed data stored in the ROM 412, 2) a current time indicated by the clock circuit 406, and, 3) a time at which the transmission command has been received; thereby dispersing the access operations. This transmission time calculation processing will be described later in more detail.

Figure 8:
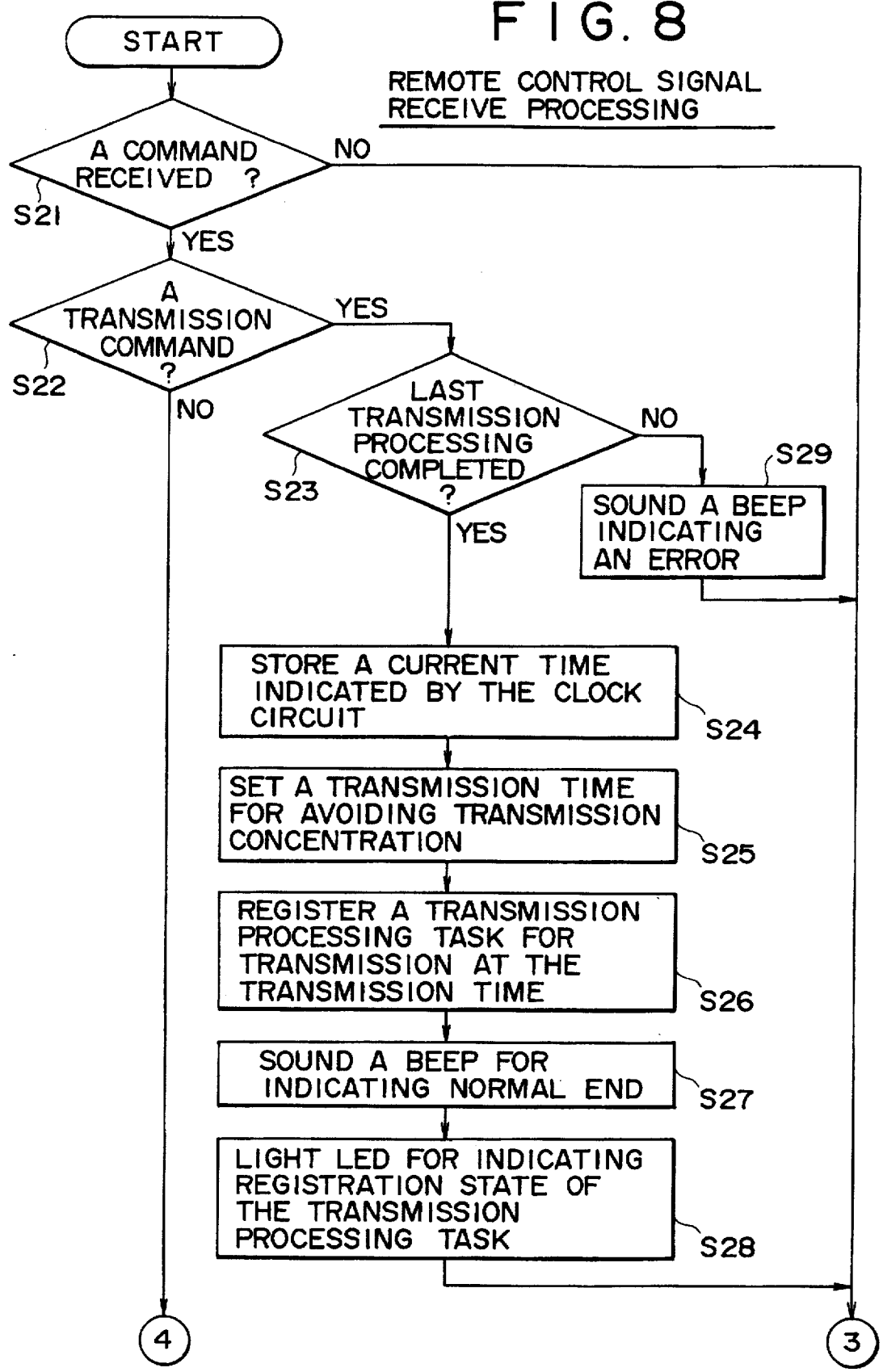
FIG. 8 is a part of a flowchart describing the remote control signal receive processing of the response information transmitting apparatus of FIG. 5.
Figure 9:
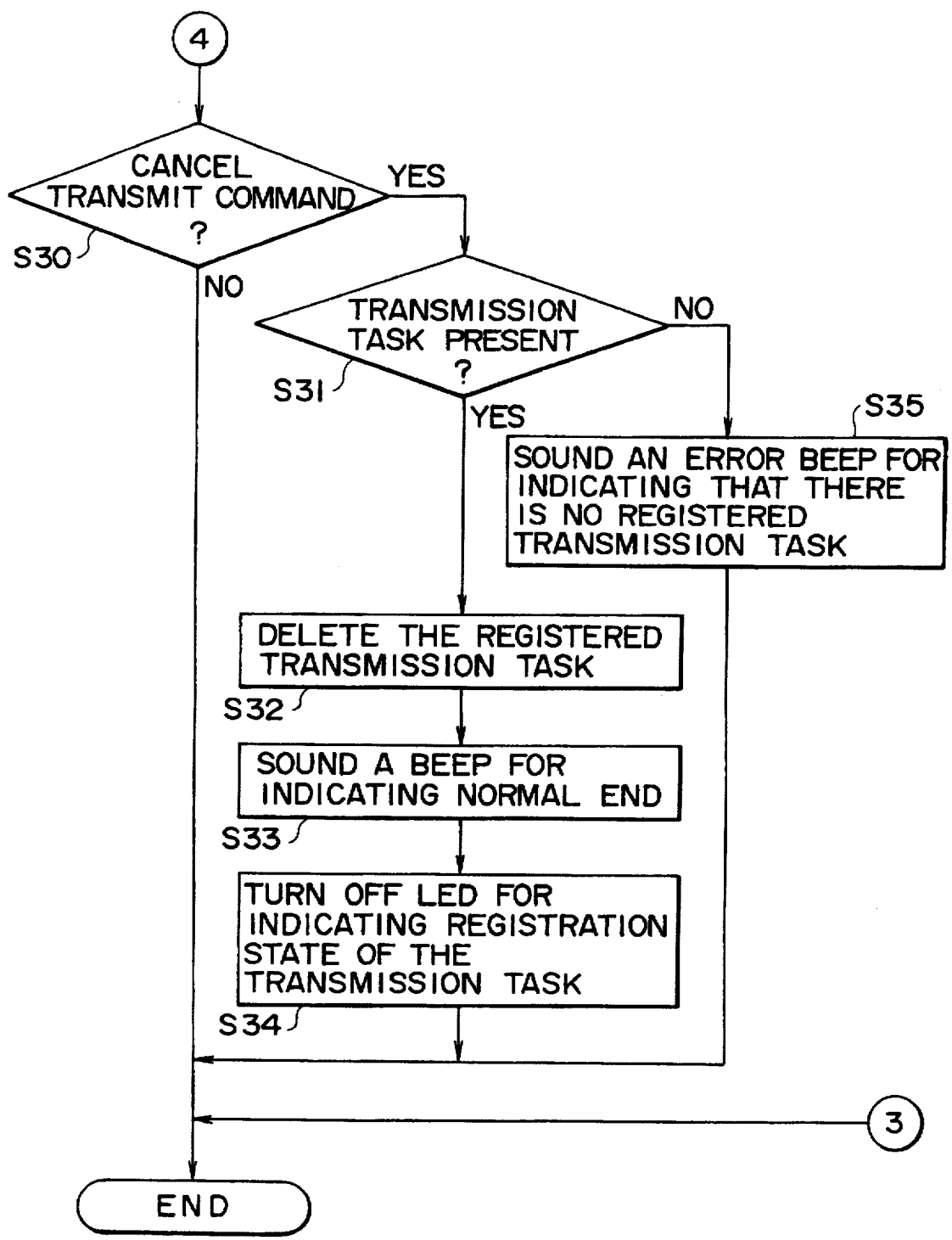
FIG. 9 is a continuation of the flowchart of FIG. 8.

The remote control signal receiving processing of the response information transmitting apparatus 400 will be described with reference to a flowchart of FIG. 8 and FIG. 9.

First, the response information transmitting apparatus 400 checks for reception of an infrared signal command (step S21). If a received infrared signal command is found, the transmitting apparatus 400 determines whether the command is a transmission command in step S22. If it is determined that the command is not a transmission command, the transmitting apparatus 400 determines whether the command is a transmission cancel command in step S30. If it is determined that the command is not a transmission cancel command, the transmitting apparatus 400 ends this receiving routine (FIG. 9).

However, if the command is found to be a transmission command in step S22, the transmitting apparatus checks whether the last transmission processing has been completed or not. If the last transmission processing has been found not completed (step S23), the transmitting apparatus causes the beeper 408 to sound an error beep (four times for example) (step S29).

If it is determined that the last transmission processing has been completed in step S23, the transmitting apparatus checks the current time indicated by the clock circuit 406 and stores the current time in the RAM 413 as a transmission command received time (step S24). Then, based on the apparatus ID and the current time obtained in step S24, the transmitting apparatus calculates a time at which the response information is to be actually transmitted (step S25). (Again, the calculation processing will be described in detail later.)

The transmitting apparatus 400 then runs a transmission processing task to cause the transmission at the calculated transmission time (step S26). The transmission processing task is a program in which the time information provided by the clock circuit 406 is referenced to cause an interrupt at the above-calculated transmission time. During an operation of the transmission processing task, time-division processing assures that receiving processing is not affected by the task. The transmission processing task routine of the preferred embodiment will be described in detail later.

When the transmission processing task has been completed, the transmitting apparatus generates a beep (two times for example) indicating a normal termination (step S27). Then, the transmitting apparatus causes the LED 404 to blink to indicate that the transmission processing task is completed, and then turns the LED 404 steady on (step S28).

On the other hand, if it is determined that the received command is a transmission cancel command (step S30), the transmitting apparatus checks for the completed transmission processing task (step S31). If no completed transmission processing task has been found, the transmitting apparatus causes the beeper 408 to generate an error beep to indicate that there is no completed transmission processing task (step S35).

If the completed transmission processing task has been found in step S31, the transmitting apparatus deletes the transmission processing task (step S32). Although not shown, if communication is already occurring at this point, the transmitting apparatus performs the processing of step S35 by assuming that there is no transmission processing task, thereby preventing the receiving side from being overloaded. Then the transmitting apparatus waits for the transmission processing task to terminate its processing and delete itself.

In the next step, the transmitting apparatus 400 makes the beeper 408 generate a beep (two times for example) to indicate that the transmission processing has been normally canceled (step S33). Further, the transmitting apparatus causes the LED 404 to blink to indicate that the transmission processing is completed, and then turns the LED 404 off (step S34). The response information transmitting apparatus 400 has thus performed the remote control signal receive processing.

(4) Transmission time calculation processing of the response information transmitting apparatus:

In a conventional telephone network, if many access operations are concentrated in a certain area at a certain time, congestion occurs, thereby making it impossible or difficult to make a call in that area. To be more specific, such congestion occurs when calls and call requests concentrate on a particular telephone line to such an extent that the number of calls or call requests exceed the processing capacity of the line.

It will be apparent that a concentration of response information transmission calls similarly causes such a congestion. Therefore, in accordance with the present embodiment of the invention, the transmission calls are dispersed to prevent requests to send from being concentrated at any one time even though responding operations may concentrate generally at the same time.

Figure 10:
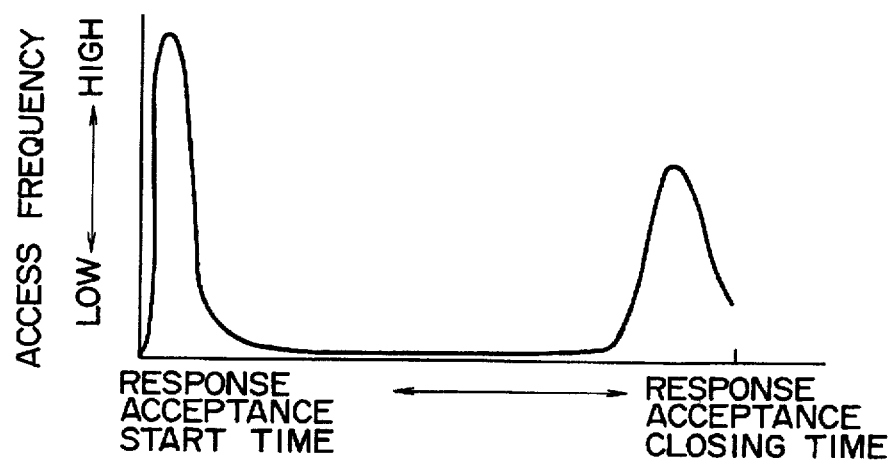
FIG. 10 is a diagram illustrating an example of response access frequency.

Research into the concentration of response transmissions indicates that, in the case of a TV shopping for example, audience responses tend to concentrate immediately after the beginning of purchase orders acceptance and immediately before the closing of acceptance of purchase orders as shown in FIG. 10, thereby causing a line congestion during these concentrated periods. To be more specific, viewers who want their orders be accepted as early as possible concentrate immediately after the start of the acceptance period and audiences who have hesitated to place orders and who finally decide to place same, concentrate immediately before closing of the acceptance period.

Figure 11:
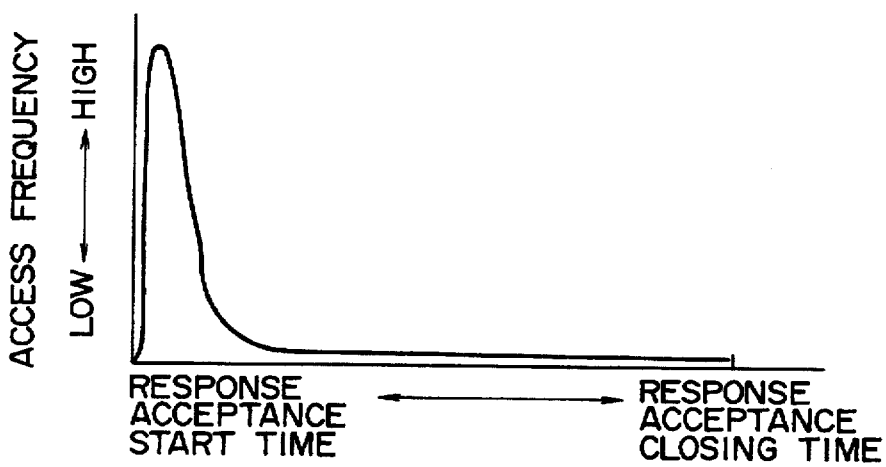
FIG. 11 is a diagram illustrating another example of response access frequency.
Figure 12:
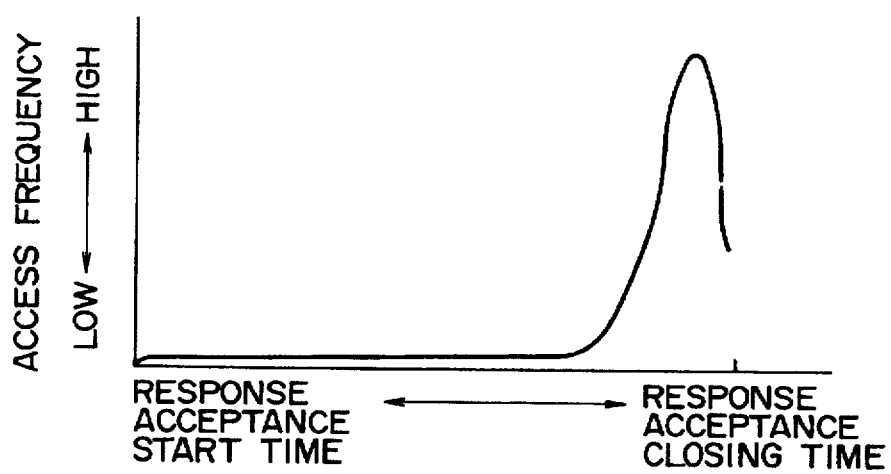
FIG. 12 is a diagram illustrating still another example of response access frequency.
Figure 13:
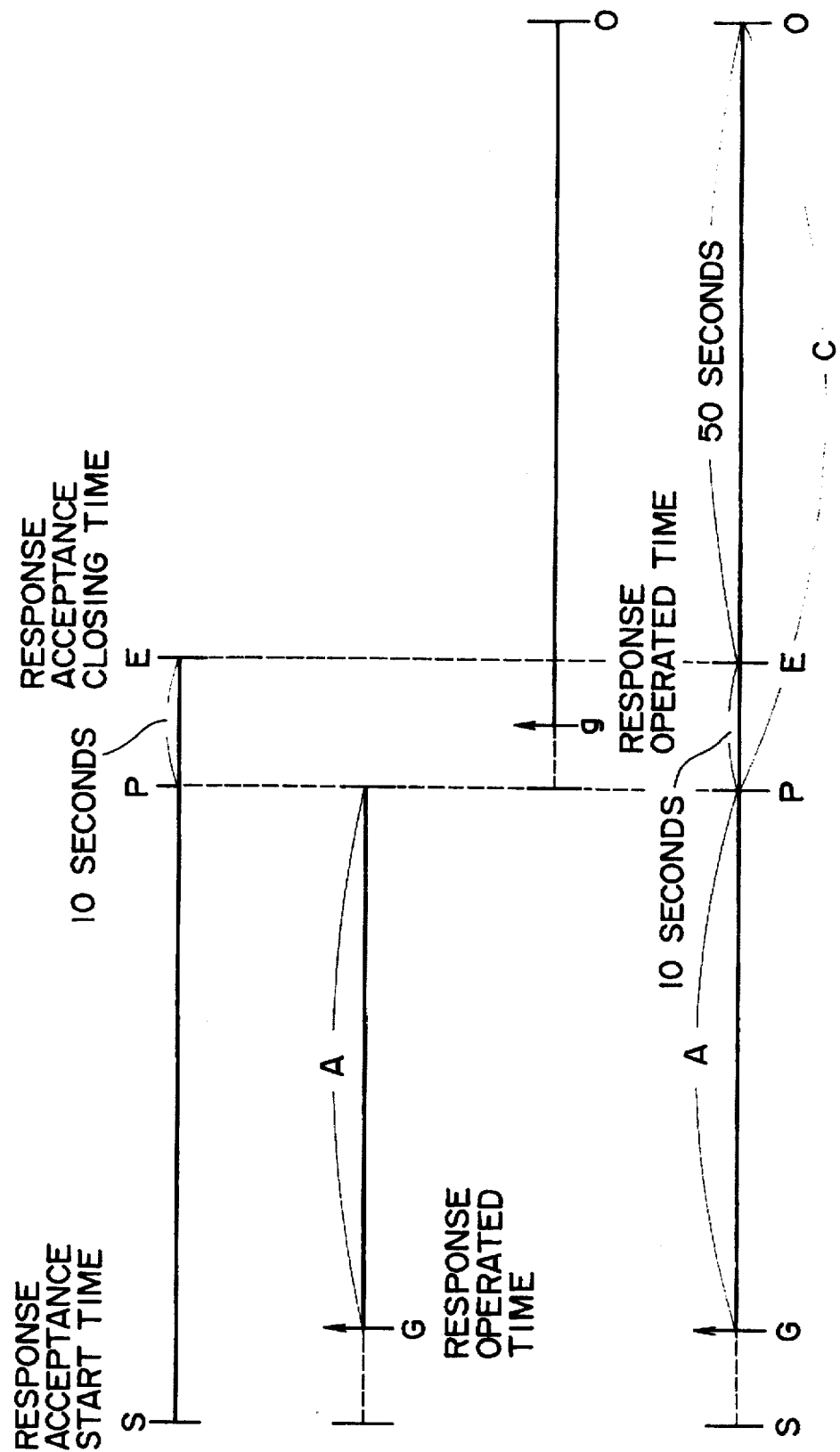
FIG. 13 is a diagram describing a transmission time setting method for the response information transmitting apparatus of FIG. 5.

In the case of the first-come, first-served quiz shows or the like, audiences want to respond as quickly as possible. Thus, the responses concentrate immediately after a response acceptance start time S as shown in FIGS. 11 and 13. On the contrary, in the case of a quiz program of the type that takes time before responding, audiences try to transmit more accurate answers, which results in a concentration of calls immediately before the closing of the acceptance period as shown in FIG. 12. The present embodiment of the invention takes both of these types of response patterns into account.

Dispersion of the transmitting operations for these responses is processed as follows. The present embodiment of the invention supposes that the response acceptance closing time E is predetermined and that this closing time is registered by each viewer beforehand. It is also supposed that, as shown in FIG. 13, the response concentration taking place immediately before the close response acceptance period E; e.g., about 10 seconds before the time E. Consequently, in this embodiment of the invention, as seen in FIG. 13, response transmissions between a time, P, 10 seconds before the time E, and the time E, are dispersed over a predetermined period of time after the time E. Such predetermined period of time may comprise any interval from 0 to 50 seconds, for example.

Responses made between the response acceptance start time S and the time P are also dispersed over an interval between the time P and times at which the operations for making the responses have been performed. It should be noted that a time G or a time g in FIG. 13 provides a time point at which a response has been made when the response is made from the button group 403 (no remote) and/or a time point at which a remote signal has been received from the remote control transmitter 300.

Figure 14:
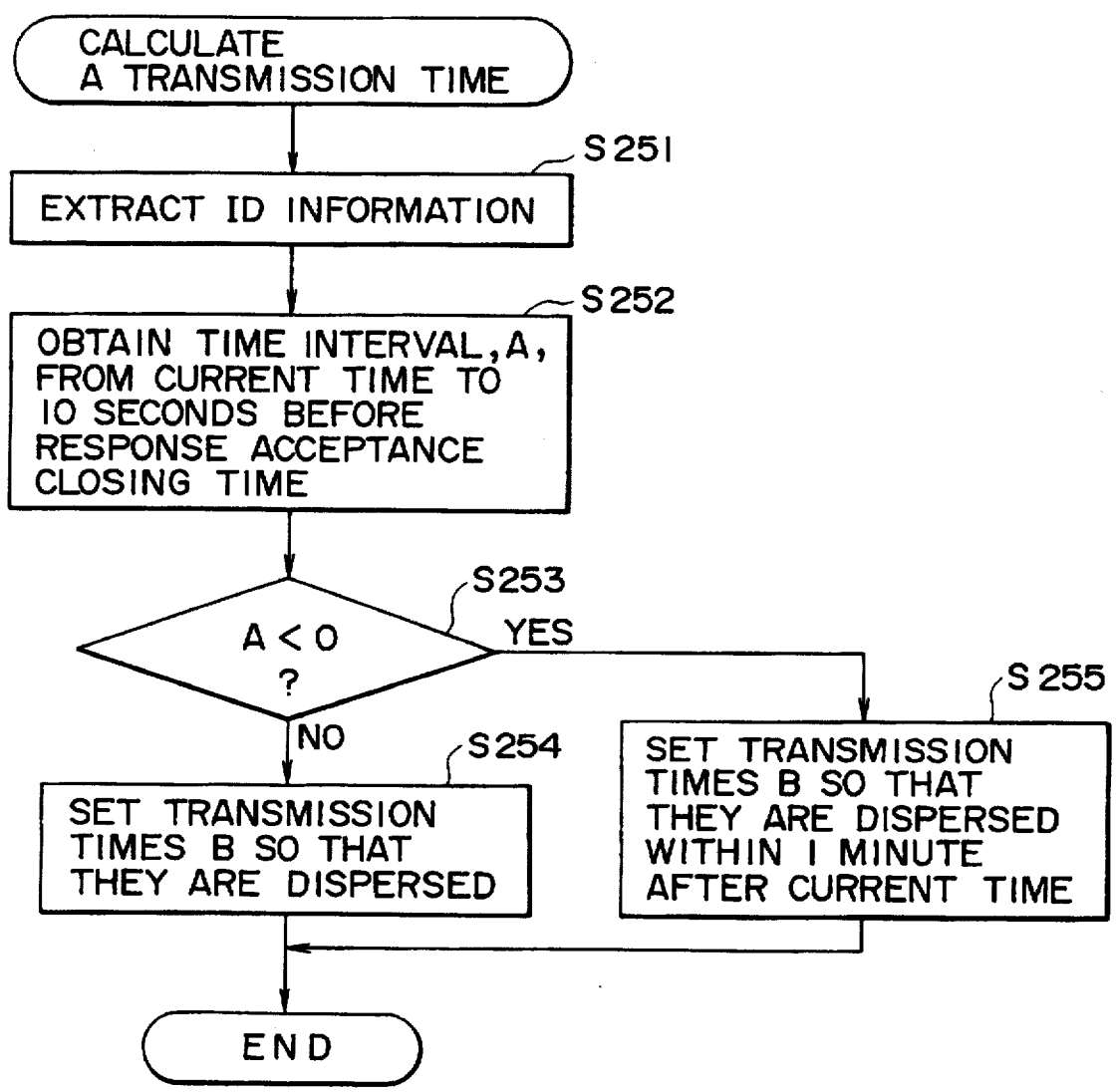
FIG. 14 is a flowchart describing a method of transmission time setting for the response information transmitting apparatus of FIG. 5.

Now, referring to FIG. 14, there is shown the above-mentioned processing routine for dispersing response information transmission times. First, the response information transmitting apparatus 400 reads the apparatus ID thereof from the ROM 412 and a registered response acceptance closing time from the RAM 413 (step S251).

Then, in step S252, the transmitting apparatus captures a current time G indicated by a timer circuit 37, the current time G representing a time at which information corresponding to a responding operation coming from the remote control transmitter 300 has been received or a time at which the responding operation has been made on the button group 403 (e.g. no remote). Then, from the following equation, the transmitting apparatus obtains a time interval A between the current time G and time, P, 10 seconds before the response acceptance closing time E (FIG. 13) (the time interval A being in units of seconds):

A =(the response acceptance closing time E)−(the current time G+10 seconds)

In next step S253, the transmitting apparatus determines whether the time interval A obtained in step S252 is positive or negative in value. In other words, the transmitting apparatus determines in this step whether the response operated time (or the time at which the responding operation information in a form of remote control signal has been received) is between the time S and the time P (A≦0) or between the time P and the response acceptance closing time E (A<0).

If the time interval A has been found to be non-negative in step S253, the response operation has been made by the viewer (or the time at which the responding operation information in a form of remote control signal has been received) is the time G which is before the time P (in FIG. 13, only the response operated time is shown), so that the transmitting apparatus 400 sets a transmission time B by using the apparatus ID number of the transmitting apparatus 400 to disperse the response transmissions in the time interval A between the time G and the time P (step S254).

An equation for obtaining the transmission time B in step S254 is as follow for example:

$$\text{Transmission time } B=(\text{two least significant digits of apparatus ID number})\times(\text{time interval } A/100)+\text{time } G \quad (1)$$

In the equation (1), the time interval A is divided by 100 because, in this embodiment of the invention, only the least significant two digits of the apparatus ID number are used and the response transmission times are dispersed within the time interval A in units of seconds.

The apparatus ID number of the transmitting apparatus 400 is an identification number unique to the apparatus and is also a random number, so that the transmission time B becomes random number, thereby dispersing the response information transmissions within the time interval A.

On the other hand, if the time interval A has been found to be negative in step S253, the transmitting apparatus 400 determines that the response operated time (or the time at which the responding operation information in a form of remote control signal has been received) is time g (indicated only as response operated time) in a range of 10 seconds between the time P and the response acceptance closing time E. The transmitting apparatus then sets the transmission time B such that the response information transmissions are dispersed within a time interval between the time g and the response transmission end time O (step S255).

An equation for obtaining the transmission time B in step S255 is as follows for example:

$$\text{Transmission time } B = (\text{two least significant digits of apparatus ID number}) \times (60/100) + \text{time } g \quad (2)$$

In the equation (2), (60/100) indicates that a time interval C (60 seconds) between the time P and the time O is divided by 100 for the same reason as set forth in equation (1).

Thus, by the processing of step S254 or S255, the transmission time B is set so as not to concentrate calls placed from the many response information transmitting apparatuses 400. In this case, it should be noted that, because any responding operation made after the response acceptance closing time is meaningless, the transmitting apparatus 400 preferably gives an alarm beep to such an operation, thereby preventing the audience from making the meaningless transmission.

(5) Response information transmission processing of the response information transmitting apparatus:

As mentioned above, the transmission processing task is a program to be activated by an interrupt after a predetermined delay time providing a preset transmission time to perform the processing in a time-division manner. This transmission processing task deletes itself upon completion of the processing and terminates.

Figure 15:
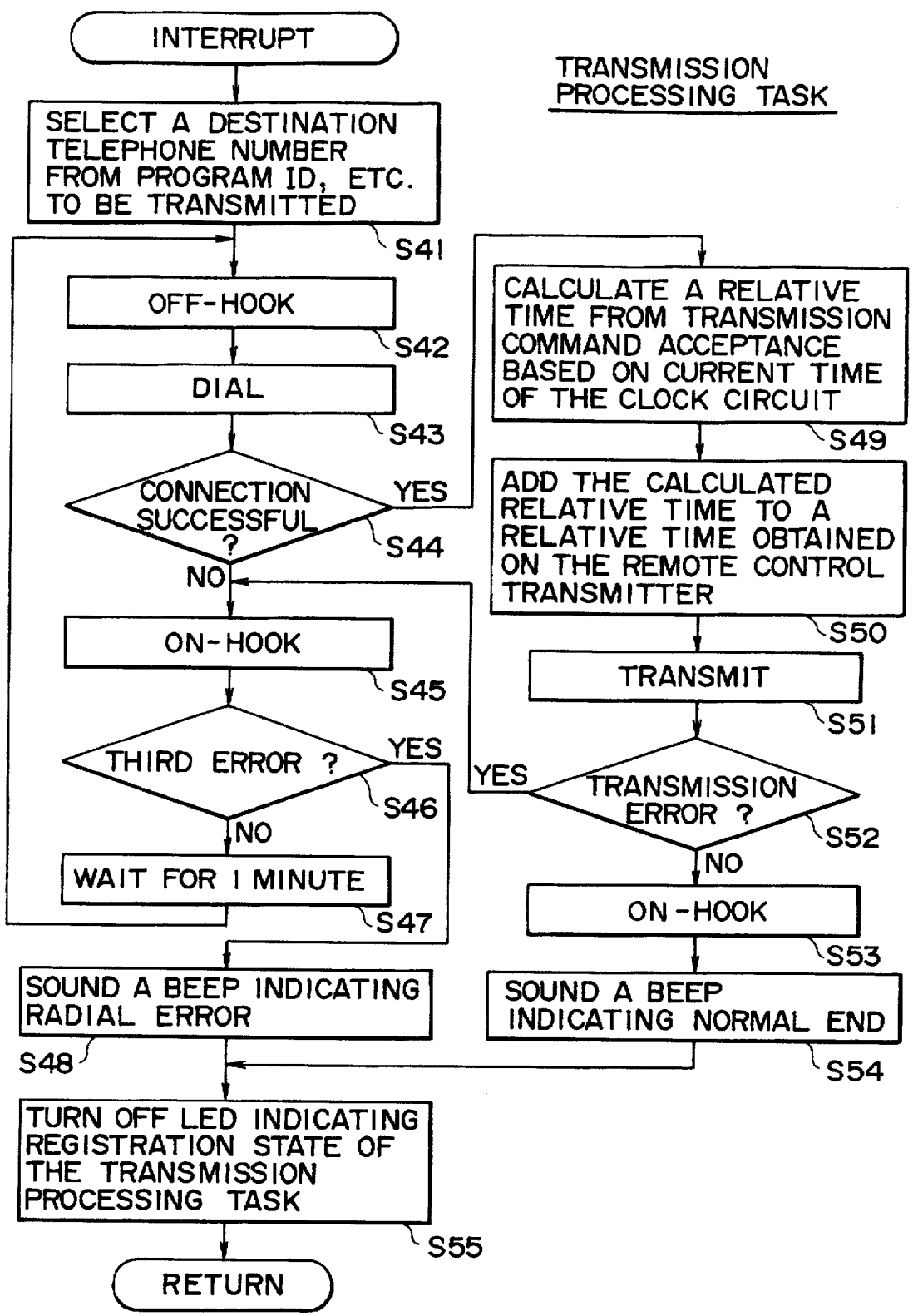
FIG. 15 is a flowchart describing transmission processing operation of the response information transmitting apparatus of FIG. 5.

Operation of the transmission processing task will be described with reference to a flowchart of FIG. 15.

When activated by an interrupt, the transmission processing task program first selects a telephone number of a transmission destination from a program ID or other information (step S41). To be more specific, based on the program ID and channel ID, the transmission processing task program selects the telephone number of the transmission destination from a telephone number table stored in the ROM 412. If the switch 409 is set to the analog extension, the transmission processing task program preferably adds a "0" to the beginning of the selected telephone number. In some cases, the telephone number of transmission destination is a fixed number.

If the ID is a numeric string obtained by coding program ID, channel ID, and telephone number similar to a so-called G code, the transmission processing task program decodes the numeric string in this step S41 to recognize the telephone number.

Then, the transmission processing task program controls the NCU 421 and the modem 422 to place the telephone off-hook (step S42) and dial the selected telephone number (off-hook dialing or automatic dialing) (step S43). At this time, the transmission processing task program also references the setting of the switch 409, originates a call in DTMF tones for a tone-based line, and begins dialing. For a 10 pps pulse-based line, the transmission processing task program originates a call in 10 pps pulses and begins dialing. For a 20 pps pulse-based line, the transmission processing task program originates a call in 20 pps pulses and makes dialing and so OR.

If the switch 409 is set to the analog extension after off-hook operation, the transmission processing task program dials a starting "0" and then waits for the line to be switched from extension to exchange office line. The transmission processing task program then confirms a dial tone for both extension and exchange office line and begins dialing. If the transmission processing task program detects a busy tone at that moment, the apparatus stops dialing.

The transmission processing task program next determines whether the line connection has been successful or not (step S44). If the line has not been connected, the transmission processing task program controls the NCU 421 or the modem 422 to place the telephone in an on-hook state (step S45). If the line connection error has occurred three times, the transmission processing task program causes the beeper 408 to sound a redial error beep (steps S46 and S48). The transmission processing task program then preferably blinks the LED 404 (which has been indicating a state of completion of registration of transmission processing), turns off the LED 404, deletes the transmission processing task, and terminates the process (step S55).

On the other hand, if the number of line connection errors is below three, the program waits one minute (steps S46 and S47) and then returns to step S42 to attempt line connection again. This operation is performed because current relevant telephone technological standards do not allow a telephone having automatic originating capability to attempt automatic origination two or more times in three minutes.

If the line connection has been found successful in step S44, the transmission processing task program subtracts 1) the time of transmission command reception from the remote control transmitter 300 from 2) the current time indicated by the clock circuit 406 to obtain 3) the elapsed time (relative time) Δtb (FIG. 1A) (step S49).

Then, the task program adds the elapsed time Δtb to the time Δta which is the time elapsed from the responding operation on the remote control transmitter 300 to the remote control transmission to obtain the time Δt. Thus Δt is the time elapsed from the time of the responding operation by the viewer to the time of the actual response information transmission by the response information transmitting apparatus. Of the pieces of information (namely, the program ID information, response number, and elapsed time Δta), the task program replaces the elapsed time ‚ta with the elapsed time Δt calculated above (step S50).

In addition to these pieces of information, the task program creates response information such as respondent information including the apparatus ID number and sends the resultant information to the response destination through the modem 422 (step S51).

Then, the task program determines whether a transmission error or a protocol error has occurred or not (step S52). If an error has been found, the task program returns to step S45. If no error has been found, the task program assumes completion of the transmission and controls the NCU 421 and the modem 422 to place the telephone in the on-hook state (line disconnection) (step S53) and make the beeper 408 sound a beep indicating the normal termination of the transmission (step S54).

Next, the task program causes the LED 404 to blink to indicate the completion of transmission processing, turns off the LED 404, deletes the transmission processing task, and terminates (step S45).

(6) Response information receiving processing at the response destination:

Finally, the processing of the response information at the broadcasting side will be described.

The response destination (or the destination for receiving viewer responses coming from the response information transmitting apparatus) has a plurality of telephone lines and causes the response calls to sequentially terminate at its receiving apparatus to record received response information. For this purpose, the receiving apparatus has an NCU and a modem for each telephone line a memory for storing the received response information and a computer-based processing controller for controlling these operations. Based on the information stored in the memory, the processing controller classifies the received responses into correct answers and incorrect answers or by response number and sorts the responses by the time at which they have been made to determine the apparatus ID of the transmitting apparatus 400 on which the earliest response has been made. Managing personal information indicated by the apparatus ID through of a database permits identification of the viewer who has made the response. For this purpose, each two-way broadcasting viewer registers the apparatus ID of the transmitting apparatus 400 into the response destination at the time of the apparatus's installation.

Figure 16:
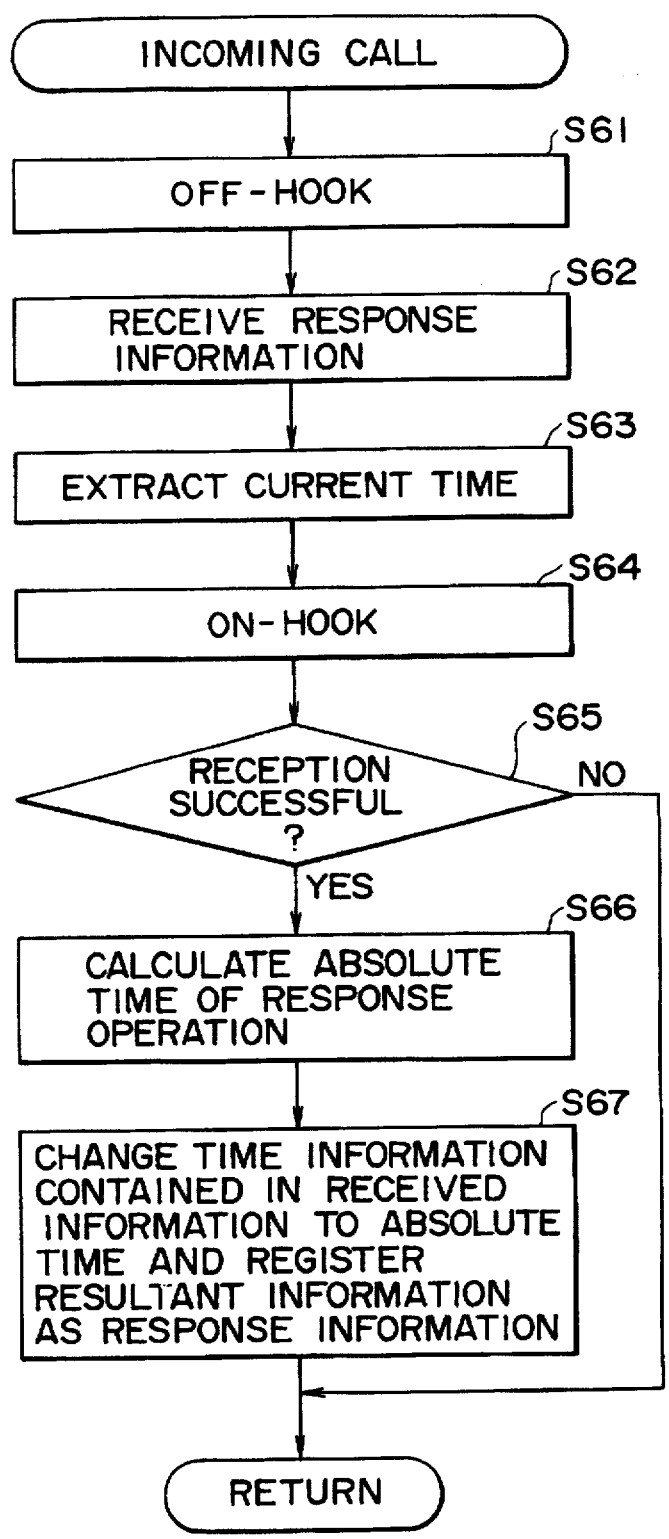
FIG. 16 is a flowchart describing the preferred embodiment of the response information receiving operation of receiving apparatus.

The response information receiving processing will be described in detail with reference to a flowchart of FIG. 16. It should be noted that the side for receiving the response information from the transmitting apparatus 400 has the correct current time.

When a call has come in, the receiving apparatus first places the off-hook (for call pick-up and line connection) and controls the modem to receive transmitted response information (steps S61 and S62).

Next, the receiving apparatus checks the current time (step S63) and places the apparatus on-hook (line disconnection) step S64. The receiving apparatus determines whether the reception has been found successful or not (step 65). If the reception has been found unsuccessful, the receiving apparatus proceeds to handle the next incoming call.

If, however, the reception has been found to be successful, the receiving apparatus subtracts the time Δt (contained in the received response information) elapsed from the time of responding operation to the time of transmission, from the current time at which the response information has been received by the receiving apparatus, in order to obtain the time at which the responding operation has been actually made (step S66). This allows the viewer to determine, as an absolute time at the response destination side, information regarding the point of time at which he has actually made the response and for which he has until this point, only a relative elapsed time.

The receiving apparatus changes the time Δt contained in the received response information to the absolute time calculated in step S65 to register the resultant response information (step S67). Then, the receiving apparatus takes to handling of a next incoming call.

Thus, the present embodiment of the invention allows the response information receiving side, namely the broadcasting side, to know securely the correct absolute time of the responding operation made at the viewer side without requiring the viewer side to set the correct time for response and/or without requiring the broadcasting side to broadcast the signal and data for setting the current time on the audience side. Therefore, even in the case of quizzes on a first-come, first-served basis, the response information receiving side can fairly determine the order in which responses to a quiz or the like have been performed at the viewer side, without being affected by telephone line traffic and/or local telephone line specifics.

Since it is not required to broadcast the signal and data for making the viewer side set the current time, it is unnecessary for the viewer side to have a particular circuit for receiving these signals and data. Consequently, as with the above-mentioned embodiment, the response information transmitting apparatus 400 of adapter type need not have a system for exchanging the information with the television receiver. As a result, the implementation of the adapter is relatively less costly, and there is no need to install a cable between the television receiver and the adapter.

In the above-mentioned embodiment, a response to a quiz for example is made on a remote control transmitter 300 to send the response information to the response information transmitting apparatus 400 in a remote control manner, so that the transmitting apparatus 400 may only be placed at a location where it is possible for the viewer to remotely control the transmitting apparatus while viewing a program. This allows the transmitting apparatus to be installed near the telephone set 500, thereby shortening a modular cable connection between the transmitting apparatus 400 and a modular jack for telephone line connection. The relatively short modular cable minimizes the degradation of speech quality on the telephone 500 due to such problems as interference and noise.

Alternatively, the response information transmitting apparatus 400 may be incorporated in the television receiver, rather than as an adapter. At the same time, the remote control transmitter 300 may be shared with a remote controller of the television receiver. It will be apparent that these arrangements result in the further reduced cost of the embodiment.

It will be also apparent that the button group 403 of the transmitting apparatus 400 of the above-mentioned embodiment may be used to respond to a two-way broadcast program without using the remote control transmitter 300. In this case, the relative elapsed time between pressing of the button group 403 and transmission of the response information is added to the response information. Based on the resultant response information, the absolute time at which the viewer has made the response can be calculated on the receiving apparatus of the response destination side in the same manner as mentioned above.

II. Second Embodiment

The above-mentioned embodiments assume two-way broadcasting in which the viewer registers information including program ID, channel ID, and a quiz ID before making a response to a relevant quiz. Alternatively, a two-way television system can be constructed in which the broadcasting side multiplexes, with a broadcast signal, information related to a two-way program including the telephone number of response destination, thereby requiring that the viewer only need to respond to the program; that is, he need not register the apparatus. Such a system is also seen in U.S. patent application Ser. No.: 08/355,132 as mentioned above.

The following describes an embodiment in which the present invention is applied to a broadcasting system for multiplexing information associated with a two-way broadcast program with a main broadcast signal and to a receiving apparatus for such a system.

In this embodiment, the broadcasting side forms program-associated information as sub-broadcast information into the form of a DTMF (Dual Tone Multi-Frequency) signal such as used in a push-button telephone line for example, and then multiplexes the resultant information with a main broadcast audio signal for broadcasting. On the receiving side, the DTMF signal is separated from the received broadcast audio signal and decoded to reproduce the program-associated information. The reproduced information is stored in memory and used for telephone communication with a response destination or a service center or used for program reservation.

A. DTMF signal

First, the DTMF signal will be described with reference to FIG. 17. DTMF signaling is an audio band signal scheme in which two kinds of tones are transmitted simultaneously; one is a low-frequency group tone and the other is a high-frequency group tone. In Japan, each of the low-frequency and high-frequency groups is made up of tones of four audio band frequencies, any of two tones being not in an attuned relation. (It will be understood that in the U.S., the high frequency group generally comprises three audio band frequencies.)

The four low-frequency DTMF signals generally are 697 Hz, 770 Hz, 852 Hz, and 941 Hz for example, and the four high-frequency DTMF signals are generally 1209 Hz, 1336 Hz, 1477 Hz, and 1633 Hz for example. The low-group frequencies and the high-group frequencies are combined with each other, one by one. The DTMF signals formed by each combination (each of these DTMF signals is hereinafter referred to a "function signal") are, in Japan, assigned to push-buttons "0" through "D" arranged in an array of 4×4 as shown in FIG. 18. (In the U.S., pushbuttons A–D are not currently available.)

In telephone communication, only 12 of the above-mentioned 16 combinations of function signals are used as subscriber address (telephone number) signals in general. That is, the 12 function signals correspond to numeric keys "0" through "9", a "*" key, and a "#" key. Function signals corresponding to alphabets "A", "B", "C", and "D" enclosed with dotted lines shown in FIG. 17 are not generally used in Japan, but are used for data transmission based on push-button (PB) dialing.

Figures 17, 18:
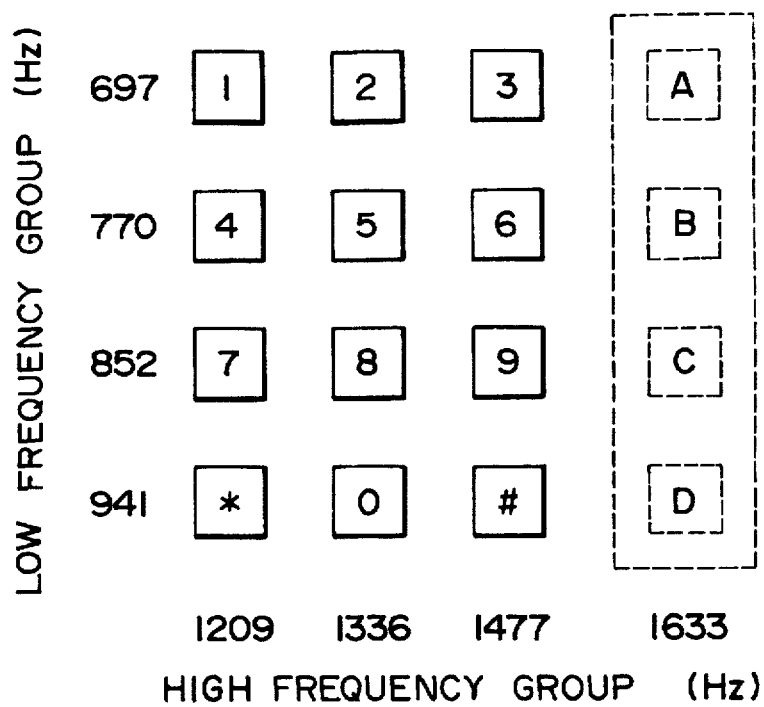
FIG. 17 is a diagram illustrating sample DTMF frequencies (in Japan)
FIG. 18 shows DTMF signal protocol specifications (in Japan)

For telephone number line selection by means of the above-mentioned DTMF signals, signal sending conditions according to the Japanese telephone system are specified as shown in FIG. 18.

Because of the combinations of the frequencies of the two groups and the signal sending conditions, each DTMF signal rarely exists naturally and therefore is clearly distinguishable from a natural sound such as human voice, which thereby allows multiplexing of the DTMF signal with an ordinary broadcast audio signal. This construction also facilitates the separation of the DTMF signal from the broadcast audio signal on the receiving side.

The DTMF signal is also used in a multi-function telephones which allow a user to reproduce a recorded message from the outside, record or reproduce an answer message, erase the recorded message by operating push-buttons, or similar such operations.

B. Broadcasting sub-broadcast information

On the transmitting side (broadcasting side) in this embodiment, before transmitting sub-broadcast information, the above-mentioned function signals "A", "B" and "C" are used as transmission start information for the sub-broadcast information and the function signal "D" is used as transmission end information.

There are generally three types of transmission start information, so that, in this embodiment, three types of sub-broadcast information can be distinguished from each other for transmission. Each of the sub-broadcast information is demarcated for transmission with one of the function signals "A", "B" and "C" and the function signal For example, information relating to response access to a two-way broadcast program, such as sub-broadcast information including a telephone number of the access destination and transmission rate, may be transmitted between the function signal "A" as transmission start information and the function signal "D" as transmission end information. Likewise, for example, sub-broadcast information related to the environment setting such as a last-digit limitation of a telephone number of the response side and current time setting is put between the function signals "B" and "D". Finally, information related to the clearing of received data may be put between function signals "C" and "D" to be multiplexed with the main audio broadcast signal for transmission.

On the receiving side, numeric and symbolic data put between one of the function signals "A", "B" and "C" as transmission start information and the function signal "D" as transmission end information are regarded as a sub-broadcast data string (an information group) to be stored in memory in corresponding predetermined areas.

For example, if access is granted to a receiver having interactive television standard version of 00, a response acceptance telephone number 0990-1234-1234 and a transmission rate of 300 bps, the sub-broadcast information generally becomes as follows:

00#0990*1234*1234 where a data string composed of function signals of DTMF signals is put between the function signals "A" and "D" to be multiplexed with the main broadcast audio signal for transmission. The first 00 of the above-mentioned data string indicates that the interactive television standard version is 00 (transmission rate of 300 bps) and the numeric data following symbol "#" is the response acceptance telephone number.

When granting access to a receiver having the interactive television standard version of 01, a response acceptance telephone number 0990-1234-1235 and a transmission rate of 1200 bps, the following data string composed of function signals of DTMF signals may be put between the function signals "A" and "D" to be multiplexed with the main broadcast audio signal for transmission:

01#0990*1234*1235 where, the first 01 of the above-mentioned data string indicates that the interactive television standard version is 01 (transmission rate of 1200 bps) and the numeric data following symbol "#" indicates the response acceptance telephone number.

It should be noted that, in the above-mentioned data strings relating to response accesses, the symbol "#" represents a separator (for individual pieces of data) and the symbol "*" represents a pause.

Now, if access is restricted to those viewers who have particular telephone numbers (subscriber numbers), or if access is granted only to the telephone numbers each ending with "0" or "1" for example, (i.e., information relating to environment setting) a respective data string 0#0 or 0#1 composed of function signals of DTMF signals may be placed between the function signals "B" and "D" to be multiplexed with the main broadcast audio signal for transmission. In this case, the numeral "0" before the symbol "#" indicates that access is granted to those telephone numbers whose last digit is a numeral following the symbol "#".

If access is granted to telephone numbers each ending with an even number, the following data string composed of function signals of DTMF signals may be placed between the function signals "B" and "D" to be multiplexed with the main broadcast audio signal for transmission:

0#0*0#2*0#4*0#6*0#8 where, the symbol "#" indicates a logic OR.

In addition, if the current time is 7:00, Dec. 15 (Tuesday), 1993 (i.e., time information relating to the reservation of receiving or recording a broadcast program), the following data string composed of function signals of DTMF signals may be placed between the function signals "B" and "D" to be multiplexed with the main broadcast audio signal for transmission:

1#1993121520700

If a program is broadcast from 7:00 to 7:29 on next Sunday relative to the current point of time, the following data string composed of function signals of DTMF signals may be placed between the function signals "B" and "D" to be transmitted:

10#07000729

If another program is broadcast from 12:00 to 14:15 on the following Monday, the following data string composed of function signals of DTMF signals may be placed between the function signals "B" and "D" to be transmitted:

11#12001415

It should be noted that, in the above-mentioned data strings relating to environment setting, the symbol "#" represents a separator and the symbol "*" represents a logic OR.

When clearing a state wherein responding telephone numbers are restricted, (i.e., information relating to the clearing of received data), the following data string composed of function signals of DTMF signals may be placed between the function signals "C" and "D" to be transmitted:

99#0

When clearing a response acceptance telephone number, the following data string composed of function signals of DTMF signals may be placed between the function signals "C" and "D" to be transmitted:

99#1

Using the function signals "A", "B", "C" and "D" as the transmission start information and transmission end information of sub-broadcast information, prevents DTMF-like tones generated during a television program from being confused with the program-related information. Also, the use of these function signals ensures the accurate sending/ receiving of the sub-broadcast information.

When recording a program with a VCR for broadcasting station use for rebroadcasting for example, horizontal and vertical synchronizing signals along with a blanking period replace those generated in the VCR. Importantly, because the DTMF signal is recorded as an audio signal, program recording in the broadcasting station does not cause a change or deletion of sub-broadcast information as mentioned above.

C. Receiving Apparatus

Figure 19:
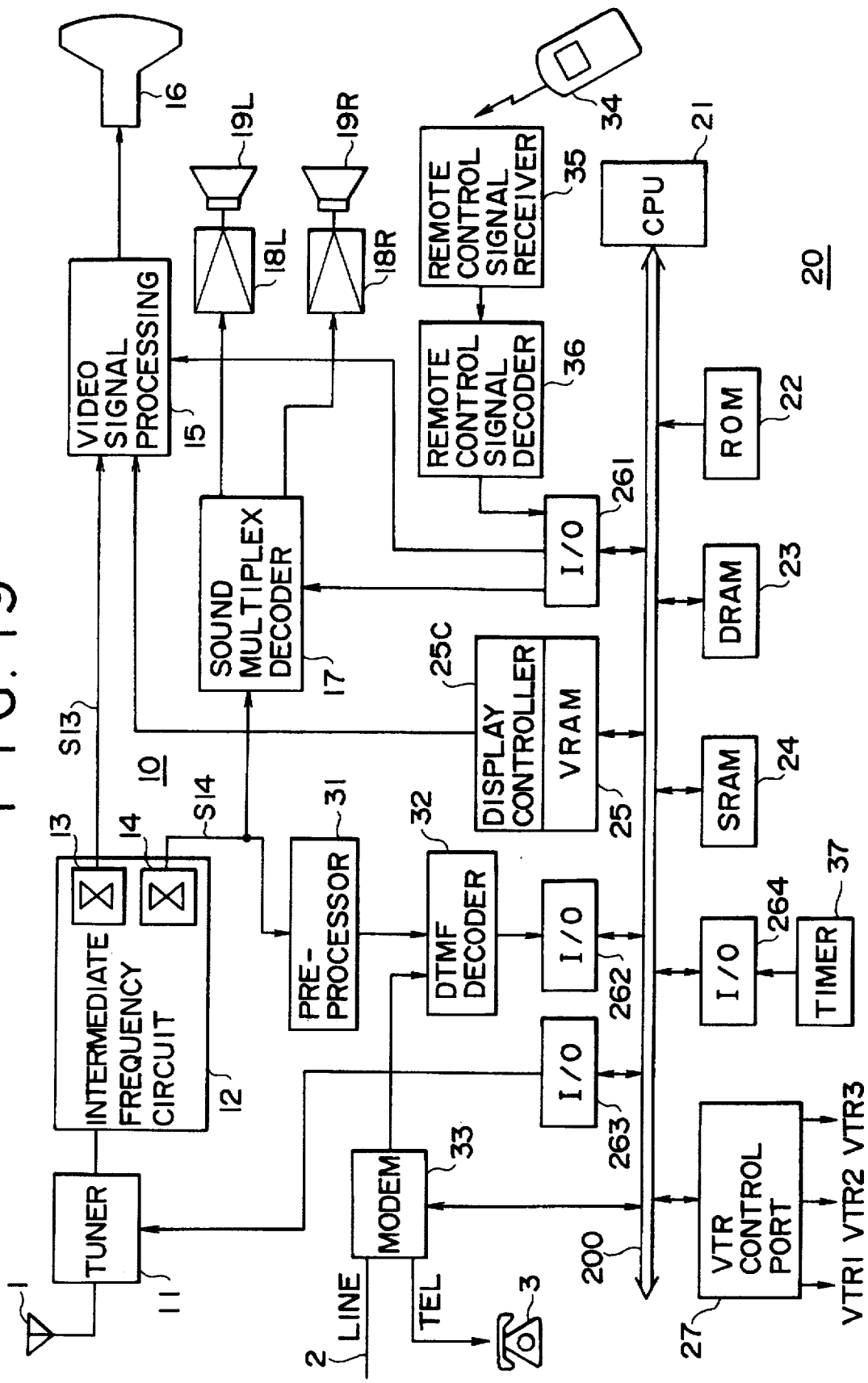
FIG. 19 is a block diagram illustrating a preferred embodiment of the receiving apparatus for a two-way broadcasting practiced.
Figure 20:
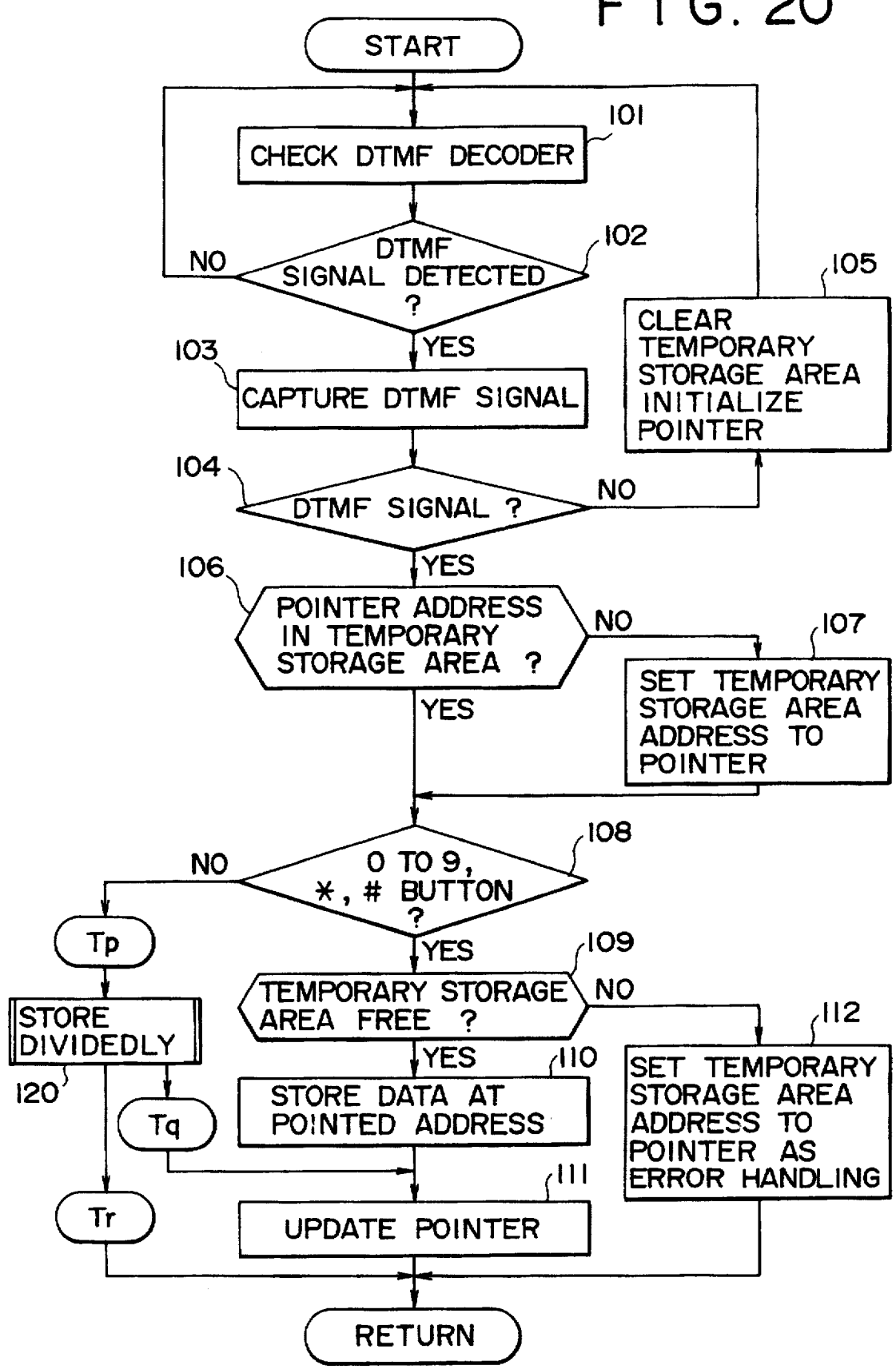
FIG. 20 is a flowchart describing the sub-broadcast information receiving operations of the receiving apparatus of FIG. 19; and, FIG. 21 is a continuation of the flowchart of FIG. 20.
Figure 21:
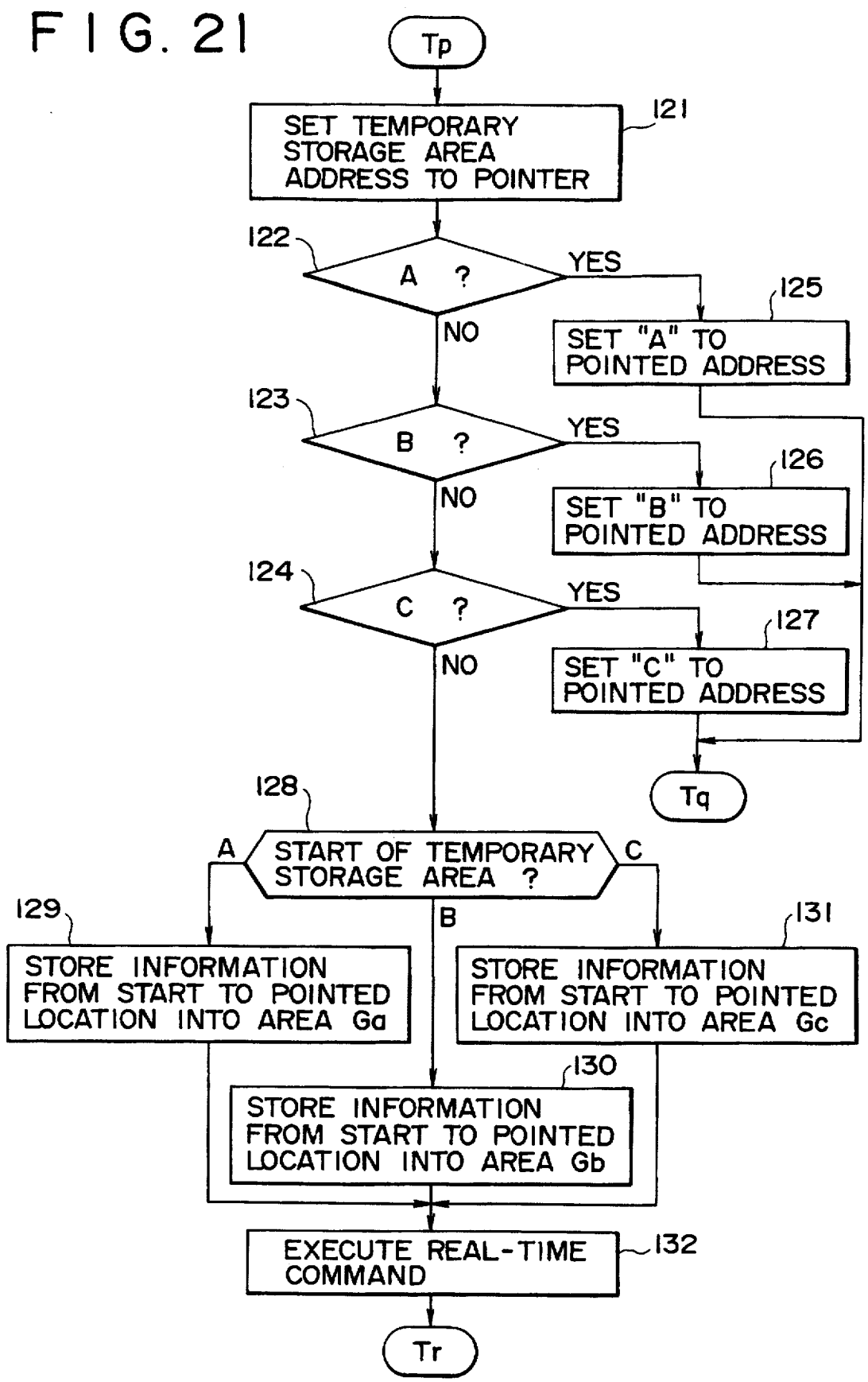

Referring to FIGS. 19, 20, and 21, a receiving apparatus for the above-mentioned two-way broadcasting practiced as one preferred embodiment of the present invention will be described, the embodiment being applied to a television receiver capable of receiving two-way broadcast programs.

A construction of the preferred embodiment is shown in FIG. 19 in which, reference numeral 10 indicates a signal system of the television receiver while reference numeral 20 indicates a control system of the television receiver.

A broadcast wave picked up by an antenna 1 is fed to a tuner 11. A select signal is also fed to the tuner 11 from the control system 20 through I/O port 263 to allow the tuner 11 to select a broadcast signal of a desired channel, which is converted to an intermediate frequency signal. The intermediate frequency signal is fed to an intermediate frequency circuit 12. The intermediate frequency circuit 12 includes a video demodulator 13 and a sound demodulator 14 which demodulate a video signal and an audio signal respectively.

The video signal S13 coming from the video demodulator 13 is fed to a picture tube 16 via a video signal processor 15. An audio signal S14 coming from the sound demodulator 14 is fed to a sound multiplex decoder 17 to be decoded into a bilingual signal or stereo signals SL and SR. The stereo signals SL and SR are respectively fed to a left-hand speaker 19L and a right-hand speaker 19R via a left-hand amplifier 18L and a right-hand amplifier 18R.

The audio signal S14 coming from the sound demodulator 14 is also fed to a DTMF decoder 32 via a preprocessor 31. The DTMF decoder 32 always searches the input signal for a DTMF signal. Upon detection of the DTMF signal, the DTMF decoder decodes the detected DTMF signal to determine which function signal the DTMF signal is. Namely, numbers "0" through "9", symbols "#" and "*", and characters "A" through "D" are decoded. The DTMF decoder then supplies the decoded data to the control system 20 through I/O port 262.

In the present embodiment, a commercially available DTMF decoder is used for the above-mentioned DTMF decoder 32. The preprocessor 31 is provided to perform preprocessing for DTMF signal decoding of higher precision if the commercially available DTMF decoder is employed. To be more specific, the preprocessor 31, composed of a filter circuit, eliminates frequency components other than the DTMF signal from the audio signal S14 so that the input signal to the DTMF decoder 32 becomes acceptable by the commercially available DTMF decoder. Thus, a low-cost circuit such as a mass-produced DTMF receiver IC chip can be used for the DTMF decoder, thereby providing a low-cost receiving apparatus such as the present embodiment.

In the present embodiment, a modem 33 for data communication is provided to permit the response to an audience participating program for example in two-way broadcasting. The modem 33 is preferably capable of generating at least one of the NCNG and NRS signals and also capable of answering muted calling.

A telephone line 2 is connected to the modem 33 at a line connection terminal "Line" thereof. A telephone set 3 is connected to the modem 33 at a telephone terminal "Tel" thereof. The modem 33 is connected to a system bus 200 of the control system 20. Data coming from the modem 33 is fed to the DTMF decoder 32. The decoded DTMF signal is captured in the control system 20.

The control system 20 has a CPU (Central Processing Unit) 21, a ROM (Read-Only Memory) 22, a DRAM (Dynamic Random Access Memory) 23, an SRAM (Static RAM) 24, and a video RAM 25, each being connected to the system bus 200. The ROM 22 stores various control programs in addition to a DTMF data receive and capture processing program to be described later. The ROM 22 also stores fonts and graphic data for use in display. The DRAM 23 is mainly used as a work area for operations. The SRAM 24 stores information about the setting of the receiving apparatus itself and ID information thereof.

The video RAM 25 is used for display. For the video RAM 25, a display controller 25C is provided to control the reading/writing of video data from the video RAM 25 and converts the read video data to an analog video signal. The analog video signal converted by the display controller 25C is then fed to the video signal processor 15. Under control of the controller 20, the analog signal is superimposed in the video signal processor 15 on a video signal coming from the intermediate frequency circuit 12 or switched thereto to be synthesized.

The control system 20 also has I/O ports 261, 262, 263 and 264, and a VCR control port 27. Control signals are fed through the I/O port 261 to the video signal processor 15 and the sound multiplex decoder 17.

A remote control signal such as an infrared remote control signal from a remote control transmitter 34 is received by a remote control signal receiver 35. The received remote control signal is decoded by a remote control signal decoder 36 to be captured at the I/O port 261 into the control system 20. In this case, the remote control transmitter 34 has the same capability as that of the remote control transmitter 300 mentioned earlier and has a remote control operation capability of the television receiver. However, unlike the remote control transmitter 300, it is not necessary for the remote control transmitter 34 to register IDs such as a program ID. The remote control transmitter 34 is preferably provided with a response button for the control system 20 to identify that a button operation on the remote control transmitter 34 has been for responding to a two-way broadcast program.

Based on programs stored in the ROM 22, the CPU 21 controls the operation performed by a viewer on the remote control transmitter 34. These programs include a program for receiving a remote control signal coming from the response information transmitting apparatus 400 mentioned earlier and a program for the response information transmission processing task. A program for controlling the television receiver is also included. For example, in remote control of tuning or volume setting, upon making these operations, the font data for displaying necessary characters and symbols is read from the ROM 22 to be transferred to the video RAM 25. The data is then fed from the video RAM 25 to the video signal processor 15 to be synthesized (superimposed for example) with the video signal S13. The resultant signal is displayed on the picture tube 16 for an appropriate period of time.

Then, the data about the tuning or the volume setting is written to the non-volatile SRAM 24 each time the operations are performed. When the power supply is turned off and then turned on, the same channel can be viewed at the same volume level as before, thereby realizing a last memory capability.

A tuning signal is fed to the tuner 11 through the I/O port 263 from the control system 20. In the present embodiment, time data coming from the timer circuit 37 for notifying the actual time and causing an interrupt at a predetermined time is entered into the control system 20 through the I/O port 264.

The VCR control port 27 preferably comprises three VCRs, VCR1, VCR2 and VCR3 in this example. The control system 20 supplies control signals to the VCRs via this control port 27 and captures status signals from the VCRs via the control port 27, thereby performing desired control of the VCRs.

It should be noted that each VCR contains a tuner and an intermediate frequency circuit to allow the VCR to be connected to the antenna I via a distributor for example. This permits reserved recording under control of the control system 20 as will be described.

D. Multiplexed information receive processing

Referring to FIGS. 20 and 21, processing for receiving the multiplexed information in the embodiment of FIG. 19 will be described below.

When the power supply to the television receiver is on, the preprocessor 31 and the DTMF decoder 32 are used to always monitor an audio signal of the program of a currently selected channel for a DTMF signal. That is, the CPU 21 searches through the I/O port 252, either constantly or at predetermined time interval, the output of the DTMF decoder 32 (step 101 of FIG. 20). When a DTMF signal has been found multiplexed with the audio signal S14 of the program currently being received (step 102), the CPU 21 captures a decode output D32 of the DTMF signal in the form of the above-mentioned numbers and symbols.

At the same time, the CPU 21 checks the sending conditions to see whether the duration of the DTMF signal is consistent with the telephone signal protocol (e.g., 50 msec or more in Japan), whether a pause between the termination of the DTMF signal and the rising of the next DTMF signal is also consistent with the telephone signal protocol (e.g., 30 msec or more in Japan), and whether the total of the duration and the pause is a specified value consistent with the telephone signal protocol (e.g., 120 msec or more in Japan). These checks are performed to confirm whether the detected DTMF signal is a true DTMF signal or not (step 104). This prevents reception of error data caused by the potentially poor quality of the received broadcast waves and, at the same time, prevents the same frequency component as the DTMF signal from being received when the frequency component is incidentally included in an ordinary voice signal.

If the received data is determined not to be a DTMF signal in step 104, then the CPU clears the temporary storage area of the DRAM 32 in step 105 and initializes a retainer pointer (not shown). Then, back in step 101, the CPU checks the output of the DTMF decoder 32.

If the received data has been found to be a DTMF signal, the CPU checks whether the retainer pointer address is within a range of the temporary storage area in step 106. If the address is not found within the temporary storage area, the receiving apparatus has been just powered on or is in an error state, so that the processing of the CPU goes from step 106 to step 107 to initialize a temporary storage area address to the retainer pointer for reset. This prevents the receiving apparatus from operating erroneously or software runaway from happening when the writing of data to the DRAM 23 is attempted to an uncertain address indicated by the retainer pointer.

If the pointer address has been determined to be within the range of the temporary storage area in step 106 or after the temporary storage area address has been initialized to the pointer in step 107, the CPU determines whether the received data contains numbers "b 0" to "9" and/or symbols "#" and "*" in step 108. If the data has been found to contain numbers and/or symbols, the processing of the CPU goes from step 108 to step 109 to check the temporary storage area for a free space.

If both the received data has been found to contain numbers and/or symbols and free space has been found, namely, the pointer indicates an address within range of the temporary storage area, the processing of the CPU goes to step 110 to store the received data (composed of "0" to "9" and/or "#" and "*") at the address indicated by the pointer. Then, the CPU increments the pointer by one character in step 111 and checks for a DTMF signal back in step 101.

If no free space has been found in step 109, a receive error is indicated, so that the CPU clears the temporary storage area in step 112 and initializes the temporary storage area to the pointer.

Now, if the received data has been found to not contain the above-mentioned numbers and/or symbols, this indicates that the received data is a character data "A", "B", "C" or "D" corresponding to one of the above-mentioned four function signals, so that the CPU activates a routine 120 for partitioned storage (of FIG. 20). The routine 120 sets a start address of the temporary storage area to the pointer in step 121 as shown in FIG. 21. Next, the routine 120 checks to see whether the received data is the function signal "A", "B" or "C" in steps 122, 123 and 124 respectively.

Then, if the received data has been found to be the function signal "A" in step 122, the routine 120 goes to step 125 to set "A" to the address indicated by the pointer. If the received data has been found to be the function signal "B" in step 123, the routine goes to step 126 to set "B" to the address indicated by the pointer. If the received data has been found to be the function signal "C" in step 124, the routine goes to step 127 to set "C" to the address indicated by the pointer. Then, the CPU increments the pointer by one character in step 111. After that, the CPU checks for a DTMF signal back in step 101.

If the received data has been found to be none of the function signals "A", "B" and "C" in step 122, 123 and 124, the routine determines that the received data is the remaining functional signal "D" and handles the data so far stored in the temporary storage area as one data string (information group).

That is, because the broadcasting side sends one of the function signals "A", "B" and "C" as a transmission start signal upon sending the DTMF signal, one of the "A", "B" and "C" is stored in the temporary storage area at a beginning thereof as a result of the processing in steps 125 through 127. Consequently, in step 128, the routine determines whether the temporary storage area starts with "A", "B" or "C".

If the temporary storage area has been found to start with the signal "A", the routine goes to step 129 to store the data string between the beginning of the temporary storage area and a last portion indicated by the pointer into a storage space Ga. If the temporary storage area has been found to start with the signal "B", the routine goes to step 130 to store the data string between the beginning of the temporary storage area and a last portion indicated by the pointer into a storage space Gb. If the temporary storage area has been found to start with the signal "C", the routine goes to step 131 to store the data string between the beginning of the temporary storage area and a last portion indicated by the pointer into a storage space Gc. These storage spaces Ga, Gb and Gc are provided in the DRAM 23 or the SRAM 24 as will be described in detail later.

After storing a data string in the appropriate storage location, the routine goes to step 132 to evaluate and analyze the received data string. If the information stored in the Ga, Gb or Gc is a command which must be executed at the time of reception, the routine performs processing corresponding to the command. For example, the routine clears a part or all of the received information, sets a current time to the timer circuit 37, and/or performs menu display select processing. Then, the CPU performs the reception check back in step 101.

Temporary information corresponding to a two-way broadcast program such as the response access information may be cleared at reception of a number clear signal. However, if the possibility that channels have been switched at reception of the clear signal is taken into consideration, it is desirable for an old number to be cleared upon turning off the power supply. Therefore, the response access information can be stored in the DRAM 23 without change. Namely, the storage space Ga can be provided in the DRAM 23.

On the other hand, the information associated with environment setting includes such time information as that for program receiving reservation and recording reservation. The time information for a reserved program must be stored for a relatively long period of time such as one week or more for example. Therefore, the environment setting information is preferably transferred to the non-volatile SRAM 24.

Consequently, in the present embodiment, the storage spaces Ga, Gb and Gc are provided in the volatile DRAM 23 or the non-volatile SRAM 24 according to conditions such as nature of the data to be stored; that is, whether the data need to be stored for long, or whether the data may be deleted upon power off, and so on.

In response processing of a simplified interactive television using an ordinary telephone line for sending response information to the broadcasting side, the necessary information of destination telephone numbers and communication conditions stored in the storage space Ga in the DRAM 23 can be automatically read for use.

Also, when making a reservation for recording, the time information about the reserved program transferred from the storage space Gb in the DRAM 23 to the SRAM 24 can be automatically read for use.

Thus, in the multiplexed data receive processing in the present embodiment, an audio signal of a broadcast program is always monitored. Furthermore, the data string put between the function signals "A" and "D", "B" and "D", or "C" and "D" in the detected DTMF signal is regarded as one piece of information to be automatically stored in the storage space Ga, Gb or Gc according to the above-mentioned type of the information. Thus, in the present embodiment, the received information can be classified and stored according to such classification.

For example, if the received function signal starts with "A", its data string is stored in the storage space Ga as information associated with response access to a two-way broadcast program. If the received function signal starts with "B", its data string is stored in the storage space Gb as information associated with environment setting. If the received function signal starts with "C", its data string is stored in the storage space Gc as information associated with received data clearing. E. Response processing for a two-way broadcast program In the above-mentioned example, when responding to a two-way broadcast program, the viewer operates the response button in advance on the remote control transmitter 34. When the control system 20 receives a remote control signal representing the operation of the response button via the remote control signal receiver 35, the control system 20 receives a subsequent remote control signal from the remote control transmitter 34, said signal representing information associated with the responding operation. Thus, preparation for responding to the two-way broadcast program has been completed.

Thereafter, when a quiz on first-come, first-served basis for example is presented, the viewer performs a selective entering operation on the remote control transmitter 34. Preferably confirming the answer made on an LCD display, the viewer presses the transmit button. The remote control transmitter 34 then sends, to the remote control signal receiver 35, a remote control signal representing information such as the numbers entered by the selective entering operation, the remote control signal added with the elapsed time between the time of the selective entering operation (the point of time at which the responding operation has been made) and the time of sending the remote control signal.

Upon receiving this remote control signal, the control system 20 writes the time of the reception to the buffer as time information of the timer circuit 37. Then, the control system 20 forms the response information from the received information and performs transmission processing for the responding operation as with the transmission processing task of the response information in the transmitting apparatus 400 mentioned earlier.

To be more specific, in the control system 20, the response information includes the above-mentioned selective entry information, the apparatus ID stored in the ROM 22 for viewer identification, and the program ID and quiz ID stored in the DRAM 23 and SRAM 24 for program and quiz identification. As mentioned earlier, the program ID and the quiz ID were multiplexed with a broadcast signal and have been demultiplexed for storage in the DRAM 23 and/or the SRAM 24.

Then, the control system 20, as mentioned earlier, obtains an actual transmission time of the response information from the apparatus ID number and the current time information indicated by the timer circuit 37 and runs the transmission processing task. Through interrupt handling, the control system 20 executes the transmission processing task when the obtained transmission time has been reached. For dialing a response destination, the telephone number information of the response destination extracted from the broadcast signal stored in the DRAM 23 or the SRAM 24 is read for use.

When the transmission of the response information is ready, the control system 20 obtains the transmission time for that transmission from the timer circuit 37 then adds this time with the elapsed time between the time of receiving the responding operation remote control signal fed from the remote control transmitter 34 and stored in the buffer and appends it to the response information. The resultant information is then sent to the response destination. On the response destination side, the point of time at which the viewer has made the response can be recognized correctly by exactly the same receive processing as mentioned earlier.

In the current example, the audience need not register the program ID and the quiz ID; therefore, it is easy for the viewer to perform the responding operations. In addition, since the DTMF signal is used for the multiplexed data and the DTMF decoder is widely used for the telephone, the receiving apparatus practiced as one preferred embodiment of the invention can be manufactured at a relatively lower cost.

III. Third Embodiment

In the above-mentioned embodiments, the response information is transmitted in the form of the data modulated/demodulated by the modem over the telephone line. For less costly transmission, a DTMF transmitter and a DTMF receiver may be used to perform the sending/receiving of the response information in the DTMF signal. In this case, a lower data transfer rate results. However, because the response information is relatively small in information volume (e.g., several bytes to several tens of bytes), the lower transfer rate does not affect the overall processing, thus providing a system which is less costly than that using a modem.

In the embodiments mentioned earlier, the present invention is applied to the television broadcasting and the television receiver. It will be understood however, that this invention is also applicable to radio broadcasting, satellite broadcasting, cable television broadcasting, and the like.

Additionally, it will be apparent that, when multiplexing the program-related information of a two-way broadcast program, the information may be superimposed on a free horizontal section of a vertical blanking period of a video signal. It will also be apparent that the program-related information may be multiplexed as a sub voice signal of voice multiplexing of television broadcasting.

As described above and according to the invention, the difference between the time at which a response to a two-way broadcast program has been made and the time at which information about the response is transmitted is added to the response information, allows the receiving side of the response information to correctly recognize the response-operated time based on the time difference.

Since the information associated with the responding operation includes the above-mentioned time difference, the responding side need not have precise time information, unlike the case in which information about the response-operated time is added. Therefore, the responding side need not manage time constantly. Also, unfairness in response acceptance that may otherwise occur due to response time differences can be eliminated. Consequently, according to the invention, the response destination can fairly and accurately determine the order in which the responses have been made, thereby also performing transmission processing in a manner so as to reduce the concentration of access attempts on a particular telephone line. This in turn allows for the implementation of the offering of such two-way broadcast programs as a first-come, first-serve quiz shows which have been difficult to practice with conventional systems using telephone lines for transmitting responses.

Further, according to the invention, it is not necessary to transmit the response information upon the actually time that the response is entered by the viewer. As a result, transmission processing of such responses can be completed in a manner so that the concentration of access attempts and thus, line congestion, on a particular telephone line is reduced.

The invention may be embodied in other specific forms without departing from the spirit or essential characteristics thereof. The above-mentioned embodiments are therefore to be considered in all respects as illustrative and not restrictive, the scope of the invention being indicated by the appended claims rather than by the foregoing description. All changes which come within the meaning and range of equivalency of the claims are therefore intended to be embraced therein.

What is claimed is:

1. A response information receiving apparatus for receiving response information included in a response selected by a viewer to a two-way broadcast program and transmitted, comprising:

a clock circuit for providing time information;

extracting means for extracting, from said response information, the difference between the time at which said response has been selected and the time at which said response information has been transmitted;

detecting means for detecting, from said time information provided by said clock circuit, the time at which said response information has been received by said receiving apparatus; and, determining means for determining the time at which said response has been selected from said time at which said response information has been received by said receiving apparatus and the extracted difference.

2. The response information receiving apparatus of claim 1, wherein said extracting means is connected to a telephone line so that said response information is received over said telephone line.

3. A system for responding to a program transmitted over a two-way broadcasting system, said program requesting a response from a viewer, said system comprising:

reproducing means for reproducing said program including said request for response;

remote control transmitting means responsive to operation by said viewer to select said response, said remote control transmitting means transmitting a remote control signal representing response information including said response, said remote control transmitting means calculating a first time difference, said first time difference comprising the difference between the time at which said response is selected by said viewer and the time at which said remote control transmitting control means transmits said response information and appending information comprising said first time difference to said response information before transmitting said remote control signal;

response information transmitting means for receiving said remote control signal including said response information, and for transmitting said response information to a predetermined destination, wherein said response information transmitting means calculates a second time difference said second time difference comprising the difference between the time at which said response information is received by said response information transmitting means and the time at which said response information transmitting means transmits said response information said predetermined destination and appending information comprising said time difference to said response information before transmitting said response information; and, receiving means located at said predetermined destination for receiving said response information from said response information transmitting means and determining from said first and second time differences, the time at which said response was selected by said viewer.

4. A method for responding to a program transmitted over a two-way broadcasting system, said program requesting the selection of a response from a viewer, comprising the steps of:

reproducing said program including said request for response on reproducing means;

determining through remote control transmitting means a first time difference between the time at which said viewer selects a response and the time at which said remote control transmitting means transmits said response information;

transmitting a remote control signal from said remote control transmitting means, said remote control signal comprising response information, said response information including said response selected by said viewer and said first time information;

receiving said remote control signal including said response information at a response information transmitting means, said response information transmitting means for transmitting said response information to a predetermined destination;

determining through said response information transmitting means a second time difference between the time at which said response information is received by said response information transmitting means and the time at which said response information transmitting means transmits said response information to said predetermined destination; and, transmitting said response information including a third time difference through said response information transmitting means to said predetermined destination, said third time difference comprising the time difference between said response selection time and said response information transmission time.

5. The system of claim 3, wherein said reproducing means comprises a television.

6. The system of claim 3, wherein said response information further includes a header for indicating that said transmitted signal comprises a said response, program identification information for identifying said program, and apparatus identification for identifying said response information transmitting means.

7. The system of claim 3, wherein said remote control transmitting means comprises:

an operating section including a response section on which said viewer selects said response;

control means responsive to said operating section to provide said remote control signal comprising response information;

clock means for providing a current time to said control means for calculating said first time difference; and, transmitting means for transmitting said response information to said response information transmitting means.

8. The system of claim 7, wherein said control means comprises a microcomputer.

9. The system of claim 3 wherein said remote control transmitting means further comprises display means for displaying information including said response.

10. The system of claim 7, wherein said transmitted response information includes information representing said current time provided by said clock means.

11. The system of claim 3, wherein said receiving means further comprises memory means for storing said response information.

12. The system of claim 3 wherein said response information transmitting means comprises:

receiving means for receiving said remote control signal including said response information;

response information generating means for generating said response information from said received remote control signal;

clock means for providing time information;

transmitting means for transmitting said response information to a predetermined destination; and, control means for determining said second time difference from said time information of said clock means and said first time difference from said remote control transmitting means.

13. The system of claim 12, wherein said remote control signal comprises an infrared signal, and receiving means comprises a remote infrared control receiver.

14. The system of claim 12, wherein said response information generating means comprises a remote control signal decoder.

15. The system of claim 12 wherein said transmitting means transmits said response information to said predetermined destination over a selected telephone line, and wherein said transmitting means comprises:

a network control unit for connecting said telephone line to said response information transmitting means;

a modem for controlling said network control unit and for modulating data to be transmitted to said predetermined destination, including said response information.

16. The system of claim 15, wherein said network control unit can perform telephone functions including generating DTMF or dial pulses and placing said telephone in an on-hook and off-hook state.

17. The system of claim 15, further comprising switch means for allowing said viewer to select said telephone line from a plurality of telephone lines having different specifications.

18. The system of claim 12 wherein said control means comprises a microcomputer, said microcomputer including a CPU and memory means.

19. The system of claim 12, wherein said response information transmitting means further comprises indicator means for indicating whether or not said remote control signal is properly received.

20. The system of claim 12, further comprising display means for displaying operating information of said response information transmitting means including whether said response information received by said receiving means is to be transmitted by said transmitting means.

21. The method of claim 4, further comprising the step of:
receiving said transmitted response information at said predetermined destination through receiving means, said receiving means determining from said third time difference the time at which said response was selected by said viewer.

22. The method of claim 4 wherein said first time difference determining step further comprises the steps of:
selecting a response including response information on an operation section of said remote control transmitting means;
storing said selected response in memory means in said remote control transmitting means; and,
checking time information through clock means in said remote control means, at the time said response information is transmitted.

23. The method of claim 4 further comprising the steps of registering said program and a viewer identification number in said remote control transmitting means.

24. The method of claim 4 wherein said program request for response has a response acceptance closing time after which responses are no longer accepted, and wherein said second time difference determining step further comprises the steps of:
extracting from memory means in said response information transmitting means said response acceptance closing time and registration information of said response information transmitting means;
checking clock time information provided by clock means of said response information transmitting means at a time when said response information is received by said response information transmitting means;
storing said clock time information in said memory means in said response information transmitting means;
calculating through control means the difference between said clock time information and a first preselected time, said first preselected time occurring before said preselected response acceptance closing time; and,
determining through said control means whether said response was selected before said first preselected time.

25. The method of claim 24 further comprising the steps of setting through said control means, a first transmission time for transmitting said response information according to said registration information, the time said response was selected, and a first time interval comprising the time between said selected response time and said first preselected time, if said response is selected before said first preselected time.

26. The method of claim 25, further comprising the step of:

setting through said control means, a second transmission time for transmitting said response information according to said registration information, the time said response was selected, and a second time interval comprising the time between said first preselected time and a preselected time after said response acceptance closing time, if said response is selected after said first preselected time.

27. The method of claim 4, wherein said remote control signal receiving step further comprises the steps of:
checking through said control means, whether a remote control signal has been received in said response information transmitting means;
checking through clock means provided in said response information transmitting means the time when said remote control signal is received;
storing said time in memory means in said response information transmitting means as received response time.

28. The method of claim 4, wherein said response information transmitting means is connected to a telephone line for transmission of said response information to said predetermined destination, and further connected to a telephone, and wherein said second time information determining step comprises the step of executing a transmission processing program for transmitting said response information in a time division manner.

29. The method of claim 28, wherein said step of executing a transmission processing program further comprises the steps of:
selecting a telephone number from memory means of said response information transmitting means, said telephone number being associated with said predetermined destination;
controlling transmitting means of said response information transmitting means to place said telephone off-hook to dial said predetermined destination telephone number;
attempting for a preselected time, to connect said telephone line to an exchange office through said transmitting means;
determining through said transmitting means whether said attempt to connect said telephone line is successful;
checking clock means of said response information transmitting apparatus to determine the time at which said connection is successful;
calculating through control means, the time it takes to transmit said response information to said predetermined destination by subtracting the time determined by said clock means when said connection is successful from the time said response information is received by said response information transmitting means.

30. The method of claim 29, wherein said connection attempting step further comprises the step of:
interrogating switch means of said response information transmitting apparatus to determine telephone specifications of said telephone line; and
originating a call over said telephone line based upon said telephone line specifications.

31. The method of claim 29 wherein said successful connection attempt determining step further comprises the steps of:

controlling said transmitting means to continue to place said telephone off-hook if said attempt to connect is unsuccessful;

attempting through said transmitting means to connect said telephone line to said exchange office line a preselected number of additional connection attempts;

terminating said attempt to connect said telephone line after said preselected number of attempts if said connection is not made.

32. The method of claim 31, wherein each of said preselected number of additional connection attempts is made after a predetermined delay.

33. The method of claim 31, wherein said preselected number of additional connection attempts is two.

34. The method of claim 32, wherein said predetermined delay is one minute.

* * * * *